United States Patent [19]
Chou et al.

[11] Patent Number: 5,902,352
[45] Date of Patent: May 11, 1999

[54] METHOD AND APPARATUS FOR TASK SCHEDULING ACROSS MULTIPLE EXECUTION SESSIONS

[75] Inventors: Stephen T. Chou, Beaverton; Russell J. Fenger, Aloha; Mohan J. Kumar; Victor B. Lortz, both of Beaverton; Mil Travnicek; Chih-Kan Wang, both of Portland, all of Oreg.

[73] Assignee: Intel Corporation, Santa Clara, Calif.

[21] Appl. No.: 08/909,384

[22] Filed: Aug. 11, 1997

Related U.S. Application Data

[63] Continuation of application No. 08/401,097, Mar. 6, 1995, abandoned.

[51] Int. Cl.⁶ .................................................. G06F 9/00
[52] U.S. Cl. ...................................... 709/102; 709/100
[58] Field of Search .................................. 395/650, 672, 395/678, 670

[56] References Cited

U.S. PATENT DOCUMENTS

| | | | |
|---|---|---|---|
| 4,284,849 | 8/1981 | Anderson et al. | 379/38 |
| 4,521,847 | 6/1985 | Ziehm et al. | 364/184 |
| 4,648,031 | 3/1987 | Jenner | 395/182 |
| 4,660,168 | 4/1987 | Gront et al. | 705/8 |
| 5,134,561 | 7/1992 | Liptay | 711/164 |
| 5,151,987 | 9/1992 | Abraham et al. | 395/182 |
| 5,363,505 | 11/1994 | Maslak et al. | 395/670 |
| 5,375,247 | 12/1994 | Hueser | 395/750.07 |
| 5,377,352 | 12/1994 | Tanaka et al. | 395/673 |
| 5,423,045 | 6/1995 | Kannan et al. | 395/750.04 |
| 5,504,897 | 4/1996 | Gans et al. | 707/104 |
| 5,519,874 | 5/1996 | Yamagishi et al. | 395/200.31 |
| 5,524,241 | 6/1996 | Ghoneimy et al. | 707/10 |
| 5,542,035 | 7/1996 | Kikinis et al. | 395/750 |
| 5,560,022 | 9/1996 | Dunstan et al. | 395/750.01 |
| 5,592,173 | 1/1997 | Lau et al. | 342/357 |

*Primary Examiner*—Majid A. Banankhah
*Attorney, Agent, or Firm*—Blakely, Sokoloff, Taylor & Zafman LLP

[57] ABSTRACT

A method and apparatus for task scheduling across multiple execution sessions allows each scheduled task to be scheduled to occur at a specific time(s), to occur periodically, or to occur in response to certain system events. A task can be scheduled which requires execution of an application even if the application is not running at the scheduled time or event, and even if the system is in a low-power standby mode at the scheduled time or event. In one embodiment, the present invention keeps track of specific time events by setting a timer(s) which indicates the time which should elapse until a scheduled event is to occur. When a timer expires, the system determines which task is scheduled to occur at the time the timer expires and executes that task. In one embodiment, the present invention checks a scheduling database to determine which task is scheduled to occur when a timer expires.

28 Claims, 10 Drawing Sheets

| | |
|---|---|
| ACTION IDENTIFICATION | 605 |
| OWNER IDENTIFICATION | 610 |
| TARGET IDENTIFICATION | 615 |
| EVENT FIELD | 620 |
| ACTION FIELD | 625 |
| POLICY FIELD | 630 |
| TOTAL COUNT | 635 |
| REMAINING COUNT | 640 |
| TIME STAMP | 645 |
| MESSAGE | 650 |
| NEXT TIME | 655 |
| MEMO | 660 |

| | |
|---|---|
| CHECKPOINT IDENTIFIER | 910 |
| TIME STAMP | 920 |
| BUFFER SIZE | 930 |
| BUFFER | 940 |

METHOD AND APPARATUS FOR TASK SCHEDULING ACROSS MULTIPLE EXECUTION SESSIONS

This is a continuation of application Ser. No. 08/401,097, filed Mar. 6, 1995, now abandoned.

BACKGROUND OF THE INVENTION

1. Field of the Invention

The present invention pertains to the field of computer systems. More particularly, this invention relates to scheduling when tasks should occur in the system.

2. Background

In copending U.S. patent application Ser. No. 08/400,029, entitled "A Computer System with Unattended On-Demand Availability", filed contemporaneously with the present application and assigned to the assignee of the present invention, a computer system capable of providing unattended on-demand availability is disclosed. The system includes power-saving features which place the system into a Standby mode whenever the system is idle or is not being used. Prior to entering Standby mode, the system sets a timer which indicates when the next scheduled event in the system should be performed. When either the timer expires or another event occurs which requires system operation, the system resumes to the On power mode without user intervention. If an application crashes, or if the computer system loses power or suffers a general crash of its software environment (that is, the operating system), the system automatically restarts application programs in accordance with restart policies established for those applications.

As people rely more and more on computer systems such as this one, the functions and capabilities that they will expect from these systems increases. One such function which would be beneficial to users is the ability to schedule specific actions or tasks to occur periodically, at specific times, or in response to certain system events. For example, these actions may include the backing up of a hard disk drive, the sending of facsimiles during "off-hours" to reduce long distance telephone line charges, or automatically receiving facsimiles for the user when the user is not expecting any and thus has not left the computer system turned on. Thus, it would be beneficial to provide a computer system which is continually available to perform scheduled tasks for the user.

Furthermore, as users rely more and more on computer systems, the reliability of these computer systems should be maintained in accordance with this reliance. That is, a computer system should be available and operational as required by the user. Thus, it would be beneficial to provide a computer system which allows a user to program the computer system for specific tasks which it should perform and then performs the actions when the specified time or event occurs. For example, the system user should be able to forget about whether the computer system power needs to be left on for a particular scheduled task, and the system user should not be concerned with the number of times the system has been turned off and on between the time of scheduling and the time the action should be performed.

Furthermore, in order for the system user to forget about the action to be performed, the user should not be required to remember which software applications should be running to perform the programmed action. Thus, it would be beneficial to provide a system which, once programmed to perform specific action, is capable of executing that application without user intervention.

The present invention provides for these and other advantageous results.

SUMMARY OF THE INVENTION

A method and apparatus for task scheduling across multiple execution sessions is described herein. Each scheduled task can be scheduled to occur at a specific time(s), to occur periodically, or to occur in response to certain system events, crossing multiple execution sessions. A task can be scheduled which requires execution of an application even if the application and/or the computer system is in a low-power mode when the scheduled time or event occurs. In one embodiment, the present invention keeps track of specific time events by setting one timer per event, which indicates the time which should elapse until a scheduled event is to occur. The earliest of these timers is then converted to a hardware timer if the system goes into Standby mode before the scheduled time arrives. When a timer expires, the system determines which task is scheduled to occur at the time the timer expires and executes that task. In one embodiment, the present invention checks a scheduling database to determine which task is scheduled to occur when a timer expires.

BRIEF DESCRIPTION OF THE DRAWINGS

The present invention is illustrated by way of example and not limitation in the figures of the accompanying drawings, in which like references indicate similar elements and in which:

FIG. 6 shows a scheduling record according to one embodiment of the present invention;

FIG. 9 shows a checkpoint record according to one embodiment of the present invention;

DETAILED DESCRIPTION

Figure 1:
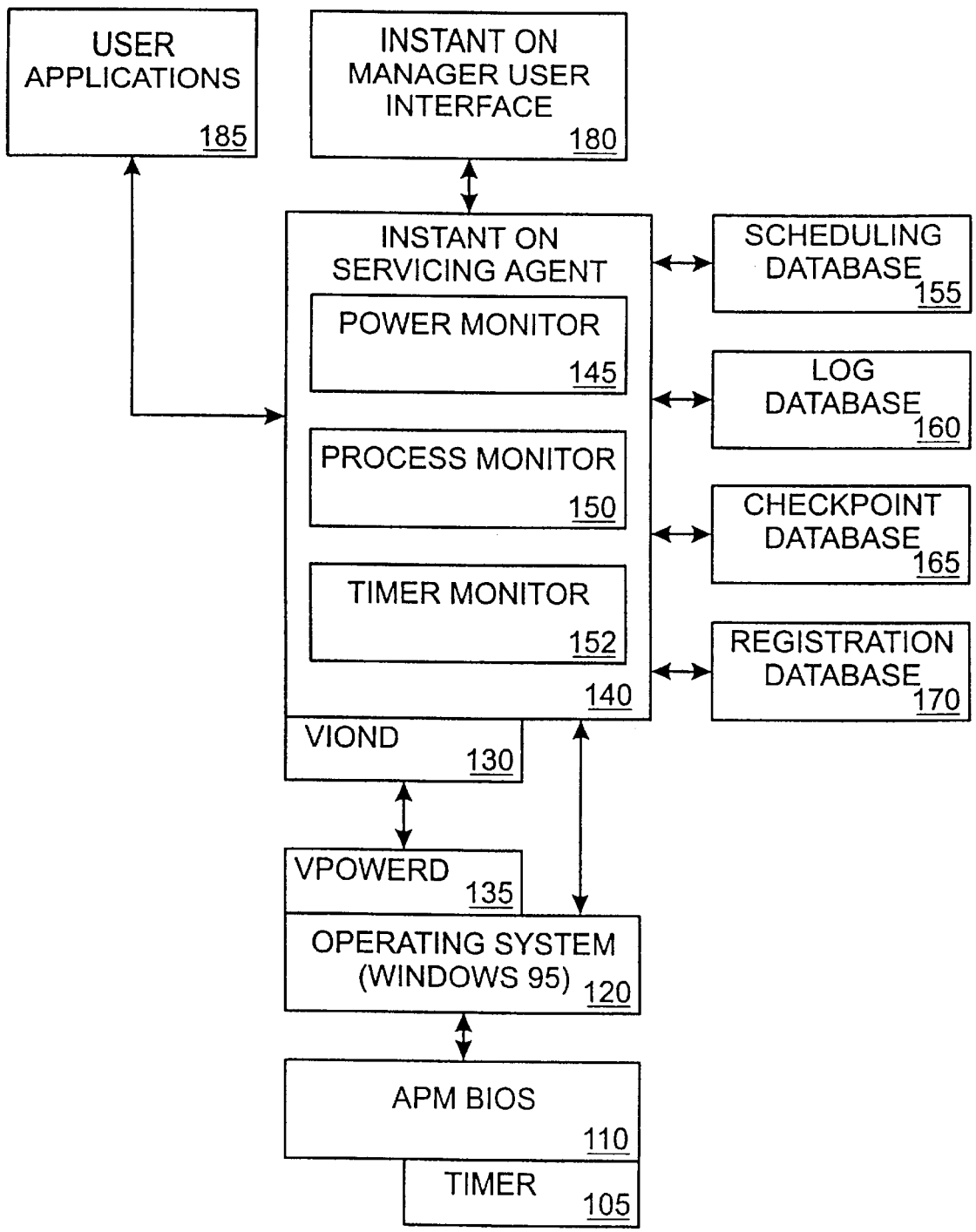
FIG. 1 is a simplified block diagram of the system architecture of one embodiment of the present invention.

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The descriptions which follow discuss four different power levels or modes: Off, On, Suspend, and Standby. The Off power mode refers to no components in the system receiving power from the system's power supply. This occurs, for example, when the computer system is unplugged from an electrical outlet. The On power mode refers to full power being available to all system components. It should be noted that some devices may still be in a power-conserving mode when the system is on, but they are able to respond quickly when needed. The system is in the On power mode, for example, when the system is being actively used by an individual. By way of another example, the system is also in the On power mode when the system is turned on to receive a facsimile, even if the monitor or other display device is not receiving power.

The Suspend power mode refers to the computer system drawing very little power from the system's power supply. Most system components do not receive power and thus cannot generate interrupts, however the operational state of the system is stored in nonvolatile memory within the system. Once in the Suspend power mode, the system can be re-started and re-stored to this same operational state by re-loading applications into main memory and providing them with the stored operational state information.

The Standby power mode refers to the system components being in a power-saving mode and the overall system consuming a very small amount of power. System components still receive power, and thus are able to generate interrupts to wake the central processing unit (CPU) from its low-power mode. Applications being executed remain in main memory, thereby allowing the system to be quickly transitioned to the On power mode without requiring applications to be re-loaded from another storage device.

Architecture of One Embodiment of the Present Invention

FIG. 1 is a simplified block diagram of the system architecture of one embodiment of the present invention. As shown, the system includes basic input/output system (BIOS) 110, operating system 120, and InstantON servicing agent 140. BIOS 110 provides an interface between operating system 120 and the various input/output (I/O) devices coupled to the system. The operating system 120 is a software application which provides an interface between BIOS 110 and other software applications running on the system, including InstantON servicing agent 140.

In one embodiment of the present invention, BIOS 110 is an advanced power management (APM) BIOS. The APM BIOS provides the computer system with the four power levels: Off, On, Suspend and Standby. The APM BIOS can be programmed to either restore the entire system to full power upon the occurrence of certain events or to restore only certain components to full power upon the occurrence of certain events. Further information on the APM BIOS can be found in the "Advanced Power Management (APM) BIOS Interface Specification", available from Intel Corporation of Santa Clara, Calif. The APM BIOS is well-known to those skilled in the art, and thus will not be discussed further.

Operating system 120 is a software application executed on the computer system which provides an interface between BIOS 110 and other software applications operating on the system. According to one embodiment of the present invention, operating system 120 is Windows™ 95, manufactured by Microsoft Corporation of Redmond, Washington. It is to be appreciated, however, that the present invention may utilize any other conventional operating system which supports the Off, On and Standby power modes, and is specifically not limited to utilizing the Windows™ 95 operating system.

InstantON servicing agent 140 provides an interface between applications operating on the system which are utilizing the InstantON services and operating system 120. In one embodiment, InstantON servicing agent 140 is a series of software instructions and routines written in the C++ programming language which carry out the functions described herein. It is to be appreciated, however, that the InstantON servicing agent of the present invention can be implemented using any of a wide variety of programming languages.

InstantON servicing agent 140 includes power monitor 145, process monitor 150, and timer monitor 152. Power monitor 145 keeps track of tasks which are scheduled for particular power level changes. Whenever a power level change occurs in the system, power monitor 145 sends any scheduled messages which are scheduled for the power level change (e.g., when the system is about to enter Standby mode or has just re-entered the On power mode). Process monitor 150 keeps track of the processes which are currently running on the computer system and the crash re-start policies of the applications which are currently registered with InstantON servicing agent 140. Thus, in the event of a system crash, InstantON servicing agent 140 can readily determine which applications were being executed at the time of the crash and which applications should be re-started when the system recovers. In the event of an individual application crash, InstantON servicing agent 140 detects the forced termination of that application process and uses the process's crash restart policy to determine if it should restart the application.

Timer monitor 152 sets software timers and performs scheduled actions when the timers expire. Timer monitor 152 also translates its closest alarm time into a wake up time for hardware timer 105 when the system goes into Standby mode, as discussed in more detail below.

InstantON servicing agent 140 is also coupled to scheduling database 155, log database 160, checkpoint database 165, and registration database 170. These four databases store the information used by InstantON servicing agent 140 to provide the InstantON services of the present invention. Scheduling database 155 contains scheduling records used for task scheduling. Log database 160 contains time stamped log records for keeping track of significant events or activities of applications. Checkpoint database 165 contains checkpoint records used for system recovery. Registration database 170 contains registration records used for the registration services of the present invention.

InstantON servicing agent 140 communicates with operating system 120 both directly and via VIOND 130. In one implementation, VIOND 130 and VPOWERD 135 are both Windows™ virtual device drivers. In one implementation, VPOWERD 135 is a virtual device driver included as part of the Windows™ 95 operating system. VIOND 130 receives power messages which are issued by VPOWERD 135. One of these power messages indicates that the computer system has just entered the On power mode from the Standby power mode, and a second message indicates that the computer system is about to enter the Standby power mode. Additionally, when InstantON servicing agent 140 determines that the system should be placed into Standby mode, VIOND 130 issues a VPOWERD_Set_System_Power_State(x) call to VPOWERD 135, which causes the system to be put into the power mode indicated as "x".

In one embodiment, all power management communications are transferred to and from operating system 120 via VIOND 130. In one implementation, whenever a request is received by operating system 120 to enter Suspend mode, VPOWERD 135 issues a message indicating a request to enter Suspend mode has been received. In response, VIOND 130 sends a message rejecting the Suspend mode to VPOWERD 135 and then sends a request to VPOWERD 135 to enter Standby mode. Thus, in this embodiment the computer system does not enter Suspend mode; any requests to enter Suspend mode cause the system to enter Standby mode.

In an alternate embodiment of the present invention, the system is allowed to enter Suspend mode. In this embodiment, the time required to resume operation is extended, and some devices are unable to generate interrupts until the system has entered a Standby or On mode. However, it is still possible to use the hardware timer to wake up the system at a predetermined time to perform scheduled activities.

BIOS 110 is also coupled to a hardware timer 105. Timer 105 is programmed by InstantON servicing agent 140 prior to entering Standby mode to indicate the amount of time until the next scheduled task is to occur, as discussed in more detail below. Timer 105 is a conventional count-down timer that receives power from the computer system's power supply when the system is in the On power mode or in the Standby power mode. Thus, once timer 105 is programmed with a value, it continuously counts down, regardless of whether the computer system is placed in and/or taken out of Standby mode. In one embodiment, timer 105 is only used to bring the system out of Standby mode to perform a scheduled task(s). In this embodiment, InstantON servicing agent 140 utilizes software timers to identify the time(s) of a scheduled task(s) when the system is in the On power mode.

When timer 105 reaches zero it issues a signal to an interrupt controller. This signal indicates to the interrupt controller that a scheduled task should occur at the current time. A system which conforms to the APM specification exits its lower power mode (that is, it wakes up) in response to a processor interrupt from the interrupt controller. Thus, in response to the processor interrupt caused by timer 105 reaching zero, the CPU exits its low-power mode and InstantON servicing agent 140 checks scheduling database 155 to determine which task(s) is scheduled for the current time and performs that task(s).

In one embodiment of the present invention, additional signal inputs to the computer system can cause an interrupt that brings the system out of Standby mode. For example, when a signal is received by the computer system from a telephone line indicating an incoming phone call, the interrupt signals to BIOS 110 that the computer system should be raised to the On power mode in order to answer the phone. By way of another example, a system may be turned on from Standby mode by a system user, such as by depressing a button on the computer system. The depression of this button causes BIOS 110 to bring the computer system to the On power mode in order to attend to the user's requests.

In one embodiment, upon receipt of a message indicating the system is entering the On power mode, InstantON servicing agent 140 determines whether to activate the system's display device. In this embodiment, BIOS 110 defers control of the resume of the display to VIOND 130. VIOND 130 determines whether to activate the display device by checking whether the event which caused the system to enter the On power mode was a user action (such as a keyboard or mouse event). If the event was a user action, then the display device is activated. However, if the event was not a user action, then VIOND 130 sends a message to BIOS 110, via VPOWERD 135, to activate the display device.

When the system becomes idle, InstantON servicing agent 140 reprograms timer 105 with the amount of time until the next scheduled task is to occur, based on the tasks contained in scheduling database 155. Upon re-programming timer 105, the InstantON servicing agent 140 issues a VPOWERD_Set_System_Power_State (Standby) call to VPOWERD 135, via VIOND 130, which causes the system to return to Standby mode.

InstantON servicing agent 140 is also coupled to InstantON user interface 180 and user applications 185. InstantON user interface 180 is a software application which provides an interface between the system user and InstantON servicing agent 140. In one embodiment, interface 180 is a graphical user interface (GUI), as discussed in more detail below with reference to FIGS. 12–14.

User applications 185 include any of a wide variety of conventional software applications which are executable on a computer system. User applications 185 call InstantON servicing agent 140 directly using application programming interface (API) procedure calls, as discussed in more detail below. A user application 185 can call InstantON servicing agent 140, for example, in order to store checkpoint data or to indicate the system should be placed in Standby mode, as discussed in more detail below.

In one embodiment of the present invention, several procedure calls are utilized by interface 180 and applications 185 to interact with InstantON servicing agent 140. In one implementation, these calls include IonEnterStandbyState and IonMonitorAutoOn. The IonEnterStandbyState procedure call causes InstantON servicing agent 140 to issue a VPOWERD_Set_System_Power_State(Standby) call to VPOWERD, via VIOND, to transition the system to Standby mode.

The IonMonitorAutoOn procedure call indicates to the InstantON servicing agent 140 whether the display device or monitor should automatically be turned on after transitioning to On power mode from Standby mode. The calling process includes, as a parameter, a Boolean variable indicating whether to activate the display device. InstantON servicing agent 140 passes this request to VIOND 130, which stores this variable and activates the display device when re-entering the On power mode based on the activity causing the transition to the On power mode and the value of this stored variable.

A Computer System of One Embodiment of the Present Invention

Figure 2:
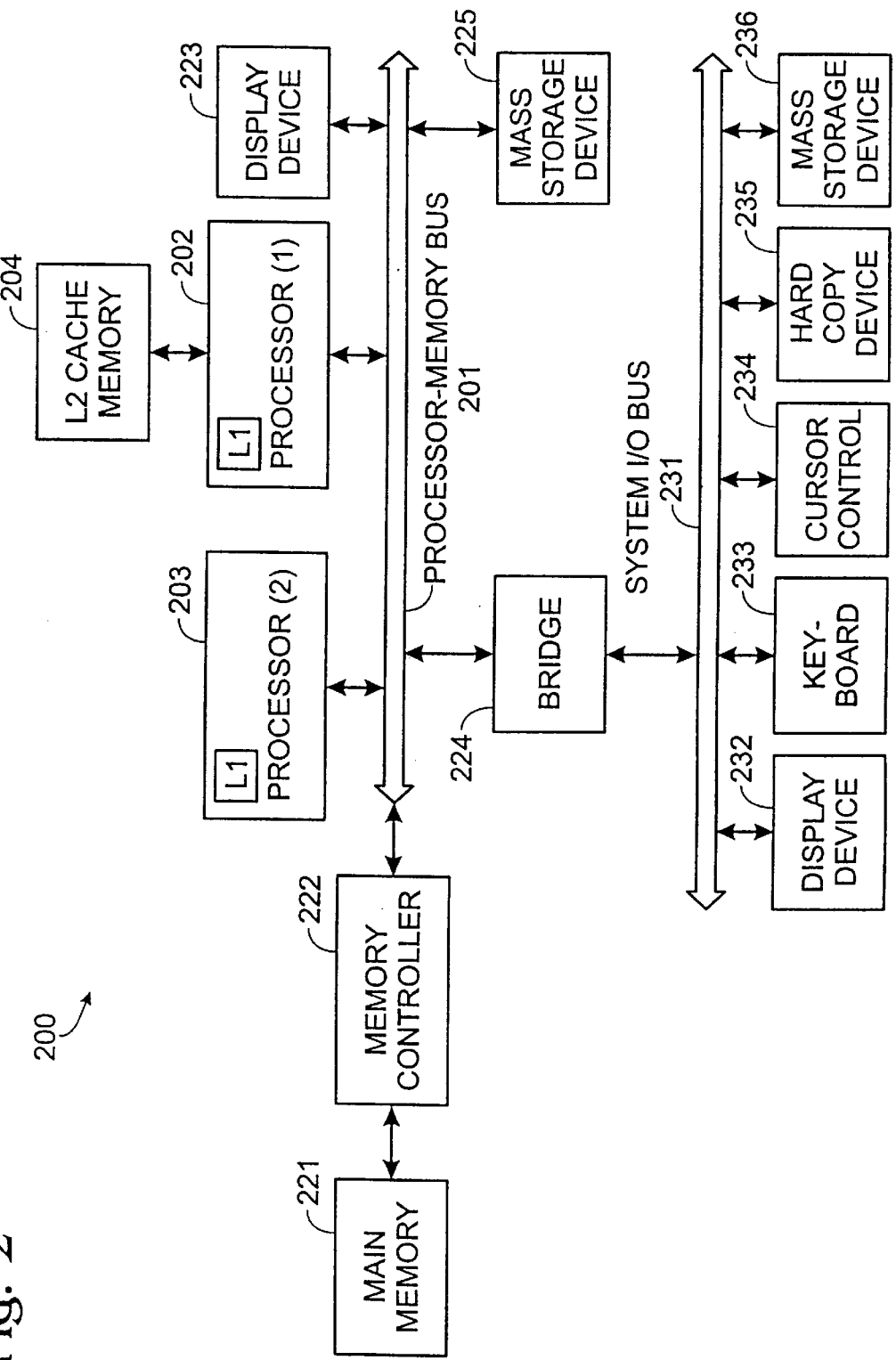
FIG. 2 shows an overview of an example multiprocessor computer system of the present invention.

FIG. 2 shows an overview of an example multiprocessor computer system of the present invention. The computer system 200 generally comprises a processor-memory bus or other communication means 201 for communicating information between one or more processors 202 and 203. Processor-memory bus 201 includes address, data and control buses and is coupled to multiple devices or agents. Processors 202 and 203 may include a small, extremely fast internal cache memory, commonly referred to as a level one (L1) cache memory for temporarily storing data and instructions on-chip. In addition, a bigger, slower level two (L2) cache memory 204 can be coupled to processor 202 for temporarily storing data and instructions for use by processor 202. In one embodiment, processors 202 and 203 are Intel® architecture compatible microprocessors; however, the present invention may utilize any type of microprocessor that includes power management support, including different types of processors.

Also coupled to processor-memory bus 201 is processor 203 for processing information in conjunction with processor 202. Processor 203 may comprise a parallel processor, such as a processor similar to or the same as processor 202. Alternatively, processor 203 may comprise a co-processor, such as a digital signal processor. The processor-memory bus 201 provides system access to the memory and input/output (I/O) subsystems. A memory controller 222 is coupled with processor-memory bus 201 for controlling access to a random access memory (RAM) or other dynamic storage device 221 (commonly referred to as a main memory) for storing information and instructions for processor 202 and processor 203. A mass data storage device 225, such as a magnetic disk and disk drive, for storing information and instructions, and a display device 223, such as a cathode ray tube (CRT), liquid crystal display (LCD), etc., for displaying information to the computer user are coupled to processor-memory bus 201.

An input/output (I/O) bridge 224 is coupled to processor-memory bus 201 and system I/O bus 231 to provide a communication path or gateway for devices on either processor-memory bus 201 or I/O bus 231 to access or transfer data between devices on the other bus. Essentially, bridge 224 is an interface between the system I/O bus 231 and the processor-memory bus 201. System I/O bus 231 communicates information between peripheral devices in the computer system. Devices that may be coupled to system I/O bus 231 include a display device 232, such as a cathode ray tube, liquid crystal display, etc., an alphanumeric input device 233 including alphanumeric and other keys, etc., for communicating information and command selections to other devices in the computer system (for example, processor 202) and a cursor control device 234 for controlling cursor movement. Moreover, a hard copy device 235, such as a plotter or printer, for providing a visual representation of the computer images and a mass storage device 236, such as a magnetic disk and disk drive, for storing information and instructions may also be coupled to system I/O bus 231.

Certain implementations of the present invention may not require nor include all of the above components. For example, the system may contain only the single processor 202. Additionally, certain implementations of the present invention may include additional processors or other components. For example, processor 203, display device 223, or mass storage device 225 may not be coupled to processor-memory bus 201. Furthermore, the peripheral devices shown coupled to system I/O bus 231 may be coupled to processor-memory bus 201; in addition, in some implementations only a single bus may exist with the processors 202 and 203, memory controller 222, and peripheral devices 232 through 236 coupled to the single bus.

In one embodiment of the present invention, BIOS 110 of FIG. 1 is stored in computer system 200 in a read only memory (ROM) which is part of main memory 221. In an alternate embodiment, BIOS 110 is stored in mass storage device 225. In another alternate embodiment, BIOS 110 is stored in a separate memory device coupled to processor-memory bus 201, such as a separate ROM device, a Flash memory device, or other nonvolatile memory devices.

Operating system 120 of FIG. 1 is stored in mass storage device 225 of FIG. 2, according to one embodiment of the present invention. Alternatively, operating system 120 may be stored in mass storage device 236 or a separate storage device coupled to processor-memory bus 201 or system I/O bus 231, such as a separate ROM device or a Flash memory device. Once the computer system has been placed in the On power mode, the operating system 120 is transferred to main memory 221. The system 200 may transfer the entire operating system 120 or only those portions which are currently needed. The loading of an operating system into main memory is well-known to those skilled in the art, and thus will not be described further.

In one embodiment of the present invention, operating system 120 begins running InstantON servicing agent 140 once operating system 120 is running. InstantON servicing agent 140 is run by copying the software routines stored in mass storage device 225 into main memory 221 and executing those software routines. It is to be appreciated that InstantON servicing agent 140 can be stored in any storage device of system 200, such as mass storage device 236 or a Flash memory device coupled to processor-memory bus 201 or system I/O bus 231.

It is also to be appreciated that computer system 200 of FIG. 2 could be any of a wide variety of computing systems or devices. For example, system 200 could be a desktop personal computer designed for either home or office use, or a larger main-frame or file-server system. By way of another example, system 200 may be a computing device within a facsimile machine or a computing device which controls home automation features and/or home security devices.

Power Levels Used by the Present Invention

Figure 3:
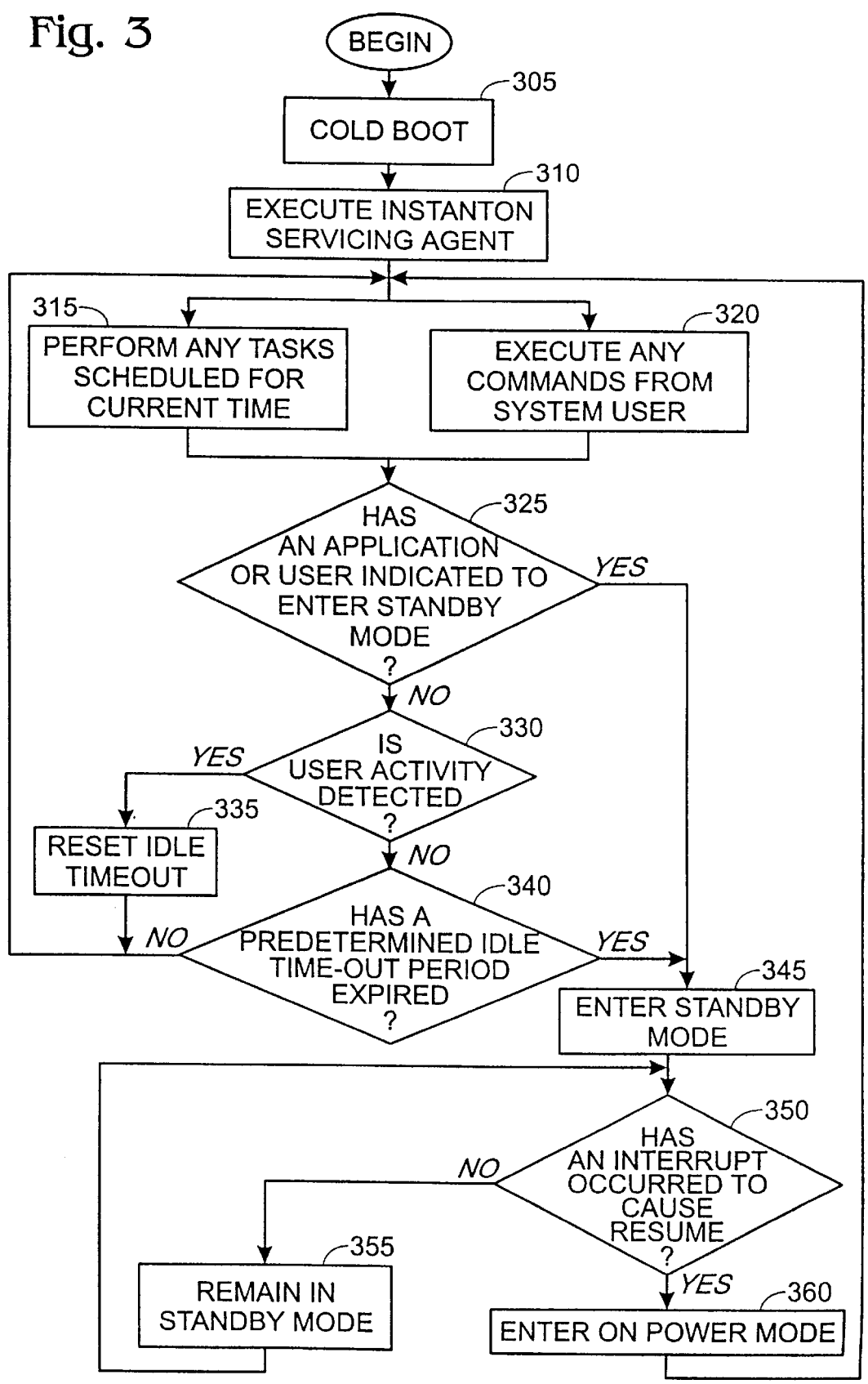
FIG. 3 is a flowchart showing the steps followed in executing tasks and transitioning between different power levels according to one embodiment of present invention.

FIG. 3 is a flowchart showing the steps followed in executing tasks and transitioning between different power levels according to one embodiment of the present invention. A computer system, such as system 200 of FIG. 2, begins operation from the Off power level by performing a cold boot, step 305. During a cold boot, the computer system initializes the memory components of the system and resets the various system components once the computer system power is at a stable operating level. This initialization and reset operation places all system components into a known operating state so that the computer system is synchronized and can operate properly. Once the initialization and reset operations are complete, the BIOS and operating system are loaded into main memory.

Once the operating system is running, InstantON servicing agent 140 is executed, step 310. In one embodiment, InstantON manager user interface 180 is also executed in step 310. Once running, the InstantON servicing agent 140 performs any tasks which are scheduled for the current time, step 315.

In addition to performing any scheduled tasks, InstantON servicing agent 140 and operating system 120 execute any commands input by the system user, step 320. These commands can be any conventional computer command, such as accessing particular files or memory locations, or entering data (such as via a word processor). Additionally, these commands may be inputs to schedule tasks for InstantON servicing agent 140, discussed in more detail below.

InstantON servicing agent 140 also checks whether an application or the system user has requested to enter Standby mode, step 325. This request may be direct from a system user or may be a procedure call issued from an application running on the system. In one embodiment of the present invention, the system user can request to enter Standby mode by switching the power system to the "off" position. In this embodiment, the traditional off/on power switch of a computer system is re-configured to cause the system to enter Standby mode rather than the Off power mode when the switch is placed in the "off" position. Thus, in this embodiment the system does not turn "off"; therefore, if a power failure occurs, the system boots up as soon as power is restored. In one implementation, an additional power switch is also included in the computer system which, when actuated, causes the system to enter the Off power mode. In an alternate embodiment, the system user can cause the system to enter the Standby power level by selecting a menu button provided by operating system 120 or InstantON manager 180, or by activating a predetermined key sequence, analogous to the ctrl-alt-del sequence used to reset some personal computers. The actuation of the predetermined key sequence by the system user is received by the operating system, which issues a signal to InstantON servicing agent 140, via VPOWERD 135, indicating the system is about to enter Standby mode.

If a request has not been received to enter Standby mode, then BIOS 110 checks whether any user activity has been detected, step 330. BIOS 110 performs this check by determining whether an activity is being performed, such as mouse events, keyboard events, or accesses to a hard disk drive. If user activity is detected, then an idle timeout system timer is reset, step 335. If user activity is not detected, then the system continues to execute commands and tasks in steps 315 through 340.

If no user activity is detected, then BIOS 110 checks whether the predetermined idle time-out period has expired, step 340. BIOS 110 performs this check by determining whether the idle timeout system timer has expired. If the time-out period expires, then the system proceeds to step 345 to begin the process of entering Standby mode. If the time-out period has not expired, then the system continues to execute commands and tasks in steps 315 through 340, until a request to enter Standby mode is received or the predetermined idle time-out period has expired.

If the idle time-out period has expired, or a system user requests to enter Standby mode, or an application requests to enter Standby mode, then the system begins the process of transitioning to Standby mode. InstantON servicing agent 140 performs any tasks scheduled for this power event and instructs VIOND 130 to program timer 105. InstantON servicing agent 140 then issues a VPOWERD_Set_ System_Power_State(Standby) call to VPOWERD 135, causing the system to enter Standby mode. In one embodiment, InstantON servicing agent 140 saves any necessary checkpoint data by sending checkpoint reminder messages to connected application processes prior to issuing the VPOWERD_Set_System_Power_State(Standby) call. The saving of the checkpoint data ensures that the system can restore itself to the same operational state once the system is returned to the On power mode. The checkpoint data is discussed in more detail below with respect to FIG. 9. However, it is to be appreciated that saving checkpoint data in step 345 is not necessary due to data and applications remaining intact in main memory when the system is in Standby mode.

In one embodiment of the present invention, InstantON servicing agent 140 provides a prompt to the system user indicating that the system is about to enter Standby mode. The user can accept entering into Standby mode, or select to stay in the On power mode. If the user selects to stay in the On power mode, processing continues at step 315, and the idle time-out system timer is reset. Thus, in this embodiment the system user is able to override entering Standby mode and remain in the On power mode.

The system remains in Standby mode until an interrupt occurs which causes the system to resume, steps 350 and 355. Once an interrupt occurs which causes the system to resume, the system enters the On power mode, step 360. The system then proceeds to execute any scheduled events or user commands in steps 315–340.

In one embodiment of the present invention, several events can occur that initiate an interrupt which causes the system to resume (that is, return to the On power mode). As discussed above, when a system user actuates the traditional power switch on the computer system to the "off" position the system actually enters Standby mode. When the system user actuates the power switch to the "on" position, the system transitions to the On power mode from the Standby power mode.

Additionally, an interrupt causing system resume can occur due to the expiration of a system timer. Timer 105 of FIG. 1, as discussed above, receives power when the system is in Standby mode. When timer 105 expires, it causes an interrupt. The interrupt controller receives this interrupt, and issues a signal to BIOS 110 to bring the system to the On power mode in order to perform the scheduled task.

Additionally, an interrupt causing system resume can also occur due to an "incoming event". An incoming event refers to a device external to the computer system attempting to access the computer system. An incoming event may be, for example, activation of a phone line due to an incoming facsimile or an incoming signal from a temperature gauge indicating the temperature in a particular room has exceeded a certain level. The happening of an incoming event causes an interrupt, resulting in the system entering the On power mode, analogous to the expiration of the timer discussed above.

By way of example, a system user may desire that the computer system receive any facsimiles which are sent to the user, regardless of whether the system is in the On power mode. The user activates the facsimile software application and can allow the computer system to enter Standby mode. Then, when the telephone rings, the interrupt caused by the telephone ring results in the computer system going to the On power mode. Since the interrupt causing the transition to the On power mode was not user activity, the monitor is not activated, but the other components of the computer system are activated. The facsimile software application then receives the facsimile and stores or prints the received data. The system then re-enters Standby mode and waits for the next event to occur to take it out of Standby mode.

In one embodiment of the present invention, the computer system contains an activity indicator which is activated whenever the system enters Standby mode after receiving an incoming event. In one implementation, the activity indicator is a light-emitting diode (LED) which is activated when it receives power. The activity indicator is controlled by BIOS 110, and is activated or deactivated by VIOND 130 sending a request to BIOS 110 to activate or deactivate it. When the system later enters the On power mode and the application which caused the activation of the activity indicator is accessed by the system user, the event indicator is deactivated. Thus, the activity indicator can be used to indicate to a system user that an incoming event has occurred which may be of interest to the user, such as receipt of a facsimile.

Application Registration According to the Present Invention

In one embodiment of the present invention, software applications are registered with InstantON servicing agent 140 so that the applications can benefit from both the checkpoint services and the task scheduling services of the InstantON servicing agent. Applications are registered with InstantON servicing agent 140 by making an IonRegister procedure call. When an application registers with InstantON servicing agent 140, the application is provided with a unique registration identifier and is also able to select a restart policy, as discussed below. The first time an application makes the IonRegister procedure call a registration record is generated by InstantON servicing agent 140. Any subsequent IonRegister calls by this same application will result in InstantON servicing agent 140 accessing this same registration record, provided a certain policy (that is, the one_only flag discussed below) is set when the subsequent call(s) is made.

In addition to being registered, application processes may also be connected to InstantON servicing agent 140. Being connected refers to a process having its InstantON registration identifier associated with the operating system process identification. It should be noted that an application is no longer connected with InstantON servicing agent 140 if execution of the application terminates, however the application is still registered. It should also be noted that a single application can have multiple instances or processes operating concurrently.

Figure 4:
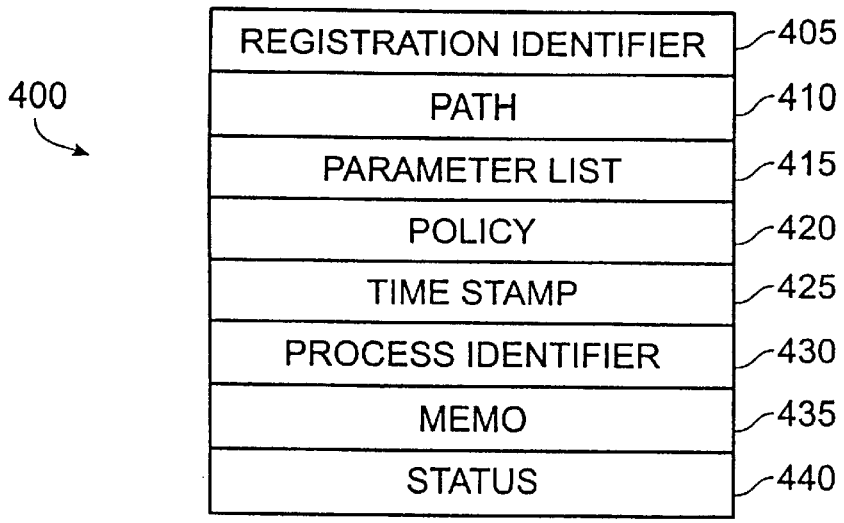
FIG. 4 shows a registration record according to one embodiment of the present invention.

In one embodiment of the present invention, each registration record is stored in registration database 170 of FIG. 1. Registration database 170 is stored in nonvolatile memory in the system, such as mass storage device 225 of FIG. 2. A registration record according to one implementation is shown in FIG. 4. Registration record 400 includes the following fields: a registration identifier 405, a path 410, a parameter list 415, a policy 420, a time stamp 425, a process identifier 430, a memo 435, and a status 440. Registration identifier 405 is a unique identifier assigned to this application by InstantON servicing agent 140 the first time the application registers. The registration identifier is unique for this application and remains the same on the computer system for all time. Thus, all subsequent executions of the application will utilize this same registration identifier each time the application is executed, regardless of whether the computer system has transitioned to the Off or Standby power modes in the meantime.

In one embodiment of the present invention, different instances or processes of the same application can be run concurrently. Each of these different processes is given a unique registration identifier. Thus, multiple registration identifiers can be associated with the same application, but only a single registration identifier is associated with each running process. Each instance of an application has a different registration record, therefore each is able to set its own restart policy and checkpoint information.

Path field 410 of registration record 400 contains the location of the application within the computer file system. In one implementation, this location is indicated by a conventional DOS path name, including an executable file name, which indicates the location of the executable code of the application on a mass storage device, such as a hard disk drive.

Parameter list field 415 provides additional parameters which are necessary for an application to begin execution. The number and nature of these parameters is dependent on the application itself. For example, some applications require no additional parameters, whereas other applications may require a data file name or configure options to be selected.

Policy field 420 provides a registration policy for the application which indicates what actions, if any, InstantON servicing agent 140 should take with regard to the application upon the happening of certain system events. In one implementation, the registration policy can be any one or more of the following policies: none, crash_restart, startup, deregister, and send_to_top_window. The none policy indicates no registration policy exists for this registration record. The crash_restart policy indicates that InstantON servicing agent 140 should execute the application whenever there has been an abnormal termination (e.g., a power failure or software crash). The startup policy indicates that InstantON servicing agent 140 should execute the application whenever the system transitions to the On power mode from the Off power mode. The deregister policy indicates that InstantON servicing agent 140 should deregister the application whenever the application terminates execution. The send_to_top_window policy indicates that InstantON servicing agent 140 should transfer any messages to the top window of the application. The send_to_top_window policy is beneficial for "legacy" applications, discussed in more detail below.

Time stamp field 425 of registration record 400 indicates the time when the record was most recently changed. This field is updated by InstantON servicing agent 140 each time registration record 400 is modified.

Process identifier field 430 is the process identification assigned to the running application process by the operating system. In one implementation, this is the Windows™ process identification, which can change each time the application is executed. It should be noted that although the Windows™ process identification may change each time the application is executed, the registration identifier for the application remains the same.

Memo field 435 provides textual information describing the application process, which allows application programmers to enter any descriptive text they desire. Status field 440 indicates whether the record is associated with an application process and if that process is connected to InstantON servicing agent 140.

InstantON servicing agent 140 supports several procedure calls which allow applications to register with the servicing agent and take advantage of the registration records. These procedure calls include: IonRegister, Ionregister, IonGetInfo, IonConnect, IonDisconnect, IonSetRegData, lonGetNextRegID, IonCompareRegID, lonGetRegRecord, and IonConnectManager.

The IonRegister procedure call provides a calling application with its unique registration identifier. The IonRegister procedure call can be made with parameters for any one or more of the parameter fields stored in registration record 400. The IonRegister procedure call can also be made with any one of several registration flags. In one embodiment, these flags include: associate__process, find__or__create, and one__only. The associate__process flag causes the Windows™ process of the application to be automatically associated with the registration identifier. The Windows™ process identifier is stored in process identifier field 430 of registration record 400 by InstantON servicing agent 140. The find__or__create flag indicates to InstantON servicing agent 140 that a matching existing registration record which is not already associated with an application process is to be returned to the application. If no matching registration record exists, then a new registration record is created for the application. In one implementation, a matching record is a record which contains the same path field 410 and parameter list field 415 as the calling application. Thus, the find__or__create flag allows a process to utilize the registration record of a previous application process, provided the previous process is no longer running and the path and parameter lists match. The one__only flag causes InstantON servicing agent 140 to return the registration identifier provided that only one registration record matches the path and parameter fields 410 and 415 of the calling application. In one implementation, InstantON servicing agent 140 returns a value indicating success and a registration identifier. If an error occurs, InstantON servicing agent 140 returns the appropriate error message, indicating that InstantON servicing agent 140 is unavailable, an invalid path was provided, an invalid registration policy was provided, an invalid flag was provided, another process is already associated with the matching registration record if the one__only flag was set, or an invalid location for receiving the registration identifier was provided.

When an application process is registered with the crash__restart policy, it is monitored by process monitor 150 of InstantON servicing agent 140. Process monitor 150 stores identifying information for processes with the crash__restart policy and any other currently connected processes in non-volatile storage of the computer system, such as mass storage device 225 of FIG. 2. In one implementation, the identifying information is registration record 400. Thus, in the event of a system power failure, when power is restored process monitor 150 can readily determine which applications, if any, were being executed at the time of the power failure, and also which applications should be executed, even if they weren't running at the time of power failure.

The crash__restart policy results in the application being restarted after an abnormal termination of the application. An abnormal termination includes, for example, the application crashing, an operating system crashing, or power failing. Once restarted, the application can return to its operational state before the termination by retrieving any of its checkpoint records, as discussed below.

A registered application can be deregistered using the IonDeregister procedure call. The IonDeregister procedure call is made with a single parameter: the registration identifier. Upon receiving an lonDeregister call, InstantON servicing agent 140 deletes the registration record having the indication registration identifier, as well as any checkpoint recovery information for the application from the checklist database. In addition, any pending messages or actions which target the deregistered application instance are also destroyed by InstantON servicing agent 140. In one implementation, InstantON servicing agent 140 returns a value indicating success, an invalid registration identifier, or that InstantON servicing agent 140 is unavailable.

The lonGetInfo procedure call provides the calling application process with the InstantON registration identifier associated with the application process, provided the process was started by InstantON servicing agent 140. An application process can be started by InstantON servicing agent 140 when, for example, a scheduled task requires an application which is not currently running. In response to the lonGetInfo procedure call, InstantON servicing agent 140 checks whether the application is registered. If the application is registered, then the registration identifier is returned to the calling application. If the application is not registered, or the application was not started by InstantON servicing agent 140, then a "not registered" indication is returned to the calling application. In one embodiment, if the application has checkpoint data stored in checkpoint database 165, InstantON servicing agent 140 also returns a flag indicating that the application has checkpoint data stored. In one implementation, InstantON servicing agent 140 returns the requested registration identifier and a value indicating success. If an error occurred, then InstantON servicing agent 140 returns a value indicating that InstantON servicing agent 140 is unavailable or that an invalid location for receiving the registration identifier was provided.

The IonConnect procedure call is utilized by the calling application process to connect to InstantON servicing agent 140 and declare its readiness to receive InstantON messages from other applications. An application process which is not connected will not receive any InstantON messages from other applications, even if it is currently running. When calling IonConnect, the application process includes as parameters the registration identifier of the application process, and a message handler and message identifier for receiving InstantON messages scheduled by IonScheduleAction, discussed in more detail below. Upon receiving the IonConnect call, InstantON servicing agent 140 associates the registration identifier supplied by the call with the calling application process. In one implementation, this association is made by storing the operating system process identification in process identifier field 430 of registration record 400. In one implementation, InstantON servicing agent 140 returns a value indicating success, an invalid registration identifier, or that InstantON servicing agent 140 is unavailable.

The IonDisconnect procedure call can be made by an application process to disconnect itself from InstantON servicing agent 140. By disconnecting itself, the application process disables receipt of any InstantON messages. In one implementation, InstantON servicing agent 140 returns a value indicating success, an invalid registration identifier, that InstantON servicing agent 140 is unavailable, or that the application is not connected.

The IonSetRegData procedure call allows an application process to change any of the fields of registration record 400 for the calling application process. The parameters for the call include the registration identifier and any one or more of the parameter fields 410 through 440 which the application process is updating. In one implementation, InstantON servicing agent 140 returns a value indicating success, an invalid registration identifier, that InstantON servicing agent 140 is unavailable, or that an invalid policy was provided.

The IonGetNextRegID procedure call provides the calling application process with the next InstantON registration identifier. In one embodiment, registration records are stored in registration database 170 in numerical order, thus leaving gaps between registration identifiers when an application process deregisters. Thus, this procedure call is beneficial to avoid making calls with invalid registration identifiers. In one implementation, InstantON servicing agent 140 returns a value indicating success, or that there is no next registration identifier.

The IonCompareRegID procedure call compares two InstantON registration identifiers. The parameters for the procedure call are pointers to the two variables that contain the two registration identifiers. In one implementation, the IonCompareRegID procedure call returns a value of zero when the registration identifiers are the same, and a value of one when they are different.

The IonGetRegRecord procedure call provides the calling application process with the ability to retrieve and examine registration records. The calling process includes as parameters a pointer to the variable that contains the registration identifier of the requested registration record, and a pointer to a variable that receives the registration record. It should be noted that the entire set of registration records can be examined by a process by alternately calling IonGetNextRegID and IonGetRegRecord. In one implementation, InstantON servicing agent 140 returns the requested registration record and a value indicating success. If an error occurred, then InstantON servicing agent returns a value indicating an invalid registration identifier, that InstantON servicing agent 140 is unavailable, or that an invalid location to receive the registration record was provided.

The IonConnectManager procedure call connects the current process of an InstantON manager 180 with InstantON servicing agent 140 for purposes of receiving database update notifications. In response, InstantON servicing agent 140 provides messages to InstantON manager 180 indicating modifications to the InstantON databases (e.g., scheduling database 155, log database 160, checkpoint database 165, and registration database 170). Thus, the IonConnectManager call enables InstantON manager 180 to efficiently reflect the current state of the InstantON databases. In one implementation, InstantON servicing agent 140 returns a value indicating success, an invalid registration identifier, or that InstantON servicing agent 140 is unavailable.

Thus, the registration services allow each application process running on the computer system to communicate with other processes via InstantON servicing agent 140 by using the unique registration identifier of the target process. Additionally, InstantON servicing agent 140 is able to execute applications as needed for task scheduling, discussed below, when the applications are registered. An application can be executed by providing the path name and parameters to operating system 120 with a request that it be executed. InstantON servicing agent 140 is also able to monitor applications which are registered or connected, and execute the proper applications whenever the system is recovering from a power failure, a system crash, or a software crash. In addition, the procedure calls described above provide processes with the ability to access and modify the data stored in the registration database.

Therefore, a computer system utilizing the registration process of the present invention is available on-demand. The system is able to automatically take itself out of a low-power mode to perform necessary tasks when requested, and is also able to recover from power failures and software or system crashes.

Figure 5:
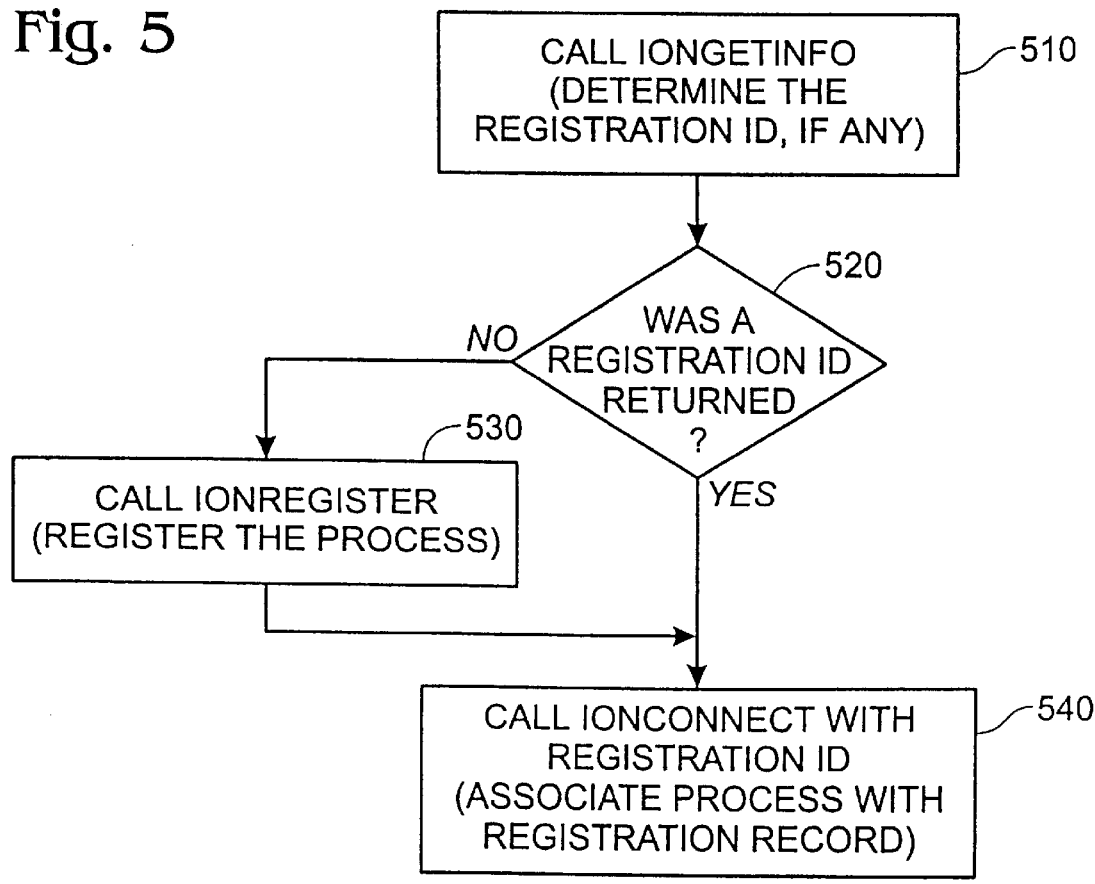
FIG. 5 is a flowchart showing the steps followed to register a process according to one embodiment of the present invention.

FIG. 5 is a flowchart showing the steps followed to register a process according to one embodiment of the present invention. The calling process first calls IonGetInfo to determine if a registration identifier already exists for this process, step 510. As discussed above, a registration identifier already exists if the process has previously registered with InstantON servicing agent 140, and the registration identifier is returned if the application was started by InstantON servicing agent 140.

The calling process then checks whether a registration identifier was returned from InstantON servicing agent 140 in response to the IonGetInfo call, step 520. If a registration identifier was returned, then the calling process makes an IonConnect procedure call with the returned registration identifier in order to connect to InstantON servicing agent 140, step 540. However, if a registration identifier was not returned, then the calling process makes an IonRegister call to find or create a registration record, step 530. The calling process then makes an IonConnect procedure call to connect to InstantON servicing agent 140, step 540, using the registration identifier returned from the IonRegister call.

In one embodiment, the present invention also provides support for "legacy" applications. A legacy application is an application which was created without taking advantage of the procedure calls supported by InstantON servicing agent 140. Since a legacy application does not support the procedure calls, the registration, checkpoint and scheduling services of the present invention are not available to the legacy application without additional support.

In one implementation, support for legacy applications is provided through an InstantON manager application. The InstantON manager application could be part of manager 180 of FIG. 1, or, alternatively, one of applications 185. The InstantON manager application is not a legacy application; rather, the InstantON manager invokes the InstantON functionality on the behalf of a legacy application. This is accomplished by first executing the InstantON manager. The InstantON manager then registers the application and schedules a launch task with InstantON servicing agent 140 (task scheduling is discussed in more detail below). The launch task can be for the current time (that is, now), or for some future time. Thus, InstantON servicing agent 140 executes the legacy application, and has both a registration identifier and a process identification for the legacy application. Messages can be sent to the legacy application from other applications by registering the legacy application with the send_to_top_window registration policy. Thus, when InstantON servicing agent 140 receives a message targeting the registration identifier of the legacy application, it forwards the message to the top window of the registered application (that is, to the legacy application).

Task Scheduling According to the Present Invention

Task scheduling refers to the scheduling of different tasks or actions which are to be performed by the computer system at certain times. These tasks include executing and terminating applications, and sending messages to processes connected to InstantON servicing agent 140. The times when these tasks are to be performed are identified by specific times or timer periods, the happening of certain events such as a change in system power level, and application status change events such as execution, termination, or crashing.

Tasks can be scheduled across multiple execution sessions. The execution sessions for a particular application process refer to the periods during which the process is running. An application process is not currently running, even if it is loaded into main memory, when the system is in Standby mode. An execution session can be terminated voluntarily (e.g., the application or system user decides to terminate execution), or involuntarily (e.g., a power failure). Tasks can be scheduled for an application which is currently running or which is to begin running at some future time.

In one embodiment of the present invention, task scheduling information is stored in a scheduling database, such as scheduling database 155 of FIG. 1. The scheduling database is stored in nonvolatile memory, such as mass storage device 225 of FIG. 2. Each task stored in scheduling database 155 includes an event, an action, and a policy. The event specifies what event will cause the action to be performed. The action specifies what steps InstantON servicing agent 140 should perform, and the policy modifies the way InstantON servicing agent 140 performs the action.

Each event which is scheduled to occur is stored in a scheduling record of the scheduling database. A scheduling record according to one implementation is shown in FIG. 6. Scheduling record 600 includes the following fields: an action identification 605, an owner identification 610, a target identification 615, an event field 620, an action field 625, a policy field 630, a total count field 635, a remaining count field 640, a time stamp field 645, a message field 650, a next time field 655 and a memo field 660.

Action identification field 605 is a unique identification value for scheduling record 600. Owner identification field 610 is the InstantON registration identifier for the application which created scheduling record 600. Target identification field 615 is the InstantON registration identifier for the application on which the scheduled action is to be performed. The action may be performed on any application registered with InstantON servicing agent 140, including the application which created the scheduling record.

Event field 620 specifies what event will cause the scheduled action to occur. In one implementation, the event is indicated by one of the following values: now, time, flexible_time, relative_time, power_event, or status_change. Event field 620 contains one of these values. In an alternate implementation, event field 620 can contain any combination of these values. The now event value indicates the action should be performed at the current time. The time event value indicates a one time or repeated time event. The flexible_time event value indicates a repeated time event that can be enabled for certain days of the week or month. The relative_time event value indicates an event which is relative to another action to be taken in the system. The power_event value indicates an event to occur at a power level change. The status_change event value indicates an event to occur at a status change of a process.

The information stored in event field 620 is dependent on the indicated event. The now event value does not require any additional information. The power event value indicates that the scheduled action should be performed when there is a power change event to the value indicated in event field 620. In one implementation, the power change event is a change to either the On power level or the Standby power level. Thus, whenever InstantON servicing agent 140 detects a power change event, the scheduled action is performed.

FIGS. 7A, 7B, 7C and 7D show example event fields 620 for a time event, a flexible_time event, a relative_time event, and a status_change event, respectively. The time event information 700 for a time event shown in FIG. 7A includes a time stamp field 703 and period field 706. Time stamp field 703 indicates the time at which the scheduled action is to occur. If the scheduled action is a repeating action, then the period field 706 indicates the frequency at which the event is repeated. If the scheduled action is a single time, then the period field contains a value of zero.

Figure 7A:
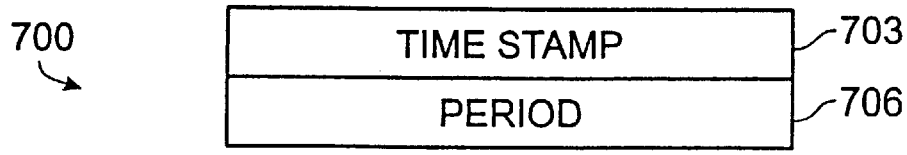
FIGS. 7A, 7B, 7C and 7D show example event fields for scheduling events according one embodiment of the present invention.
Figure 7B:
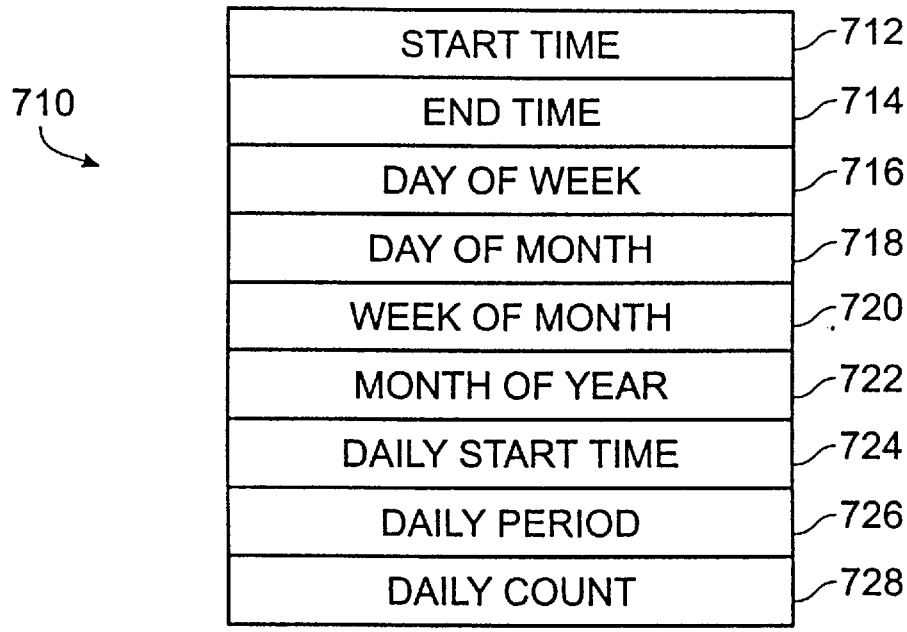

The time event information 710 for a flexible_time event shown in FIG. 7B provides the calling application with flexibility to program any starting time, ending time, or periodic time for the event. Start time field 712 contains a time and date which indicates when the scheduled action is to begin taking place. The action will not be performed prior to the time of start time field 712, regardless of the values stored in fields 714 through 728. End time field 714 contains the time and date when the scheduled action is to stop taking place. InstantON servicing agent 140 deletes scheduling record 600 after the time and date contained in end time field 714.

The selected days for the scheduled action can be indicated by setting day of week field 716, day of month field 718, week of month field 720, and month of year field 722. Any combination of fields 716, 718, 720 and 722 can be set. Daily start time field 724 provides a period of time after midnight at which the scheduled action should occur. Daily period field 726 indicates the frequency at which the scheduled action is repeated throughout the day. Daily count field 728 indicates the maximum number of periodic event occurrences for the scheduled action per day.

Figure 7C:
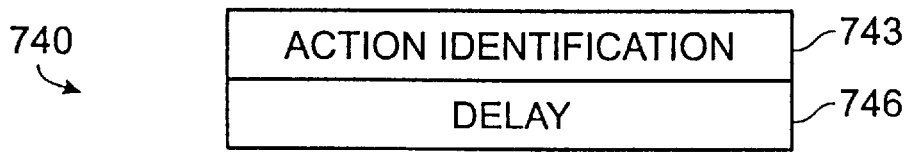

The time event information 740 for a relative_time event shown in FIG. 7C includes an action identification field 743 and a delay field 746. The action identification field 743 contains the action identification of the scheduling record which this scheduled event is relative to. The delay field 746 contains the amount of time after the action identified in action identification field 743 occurs that this scheduled action should occur. Thus, an action can be scheduled to occur at a predetermined time after another scheduled action occurs.

Figure 7D:
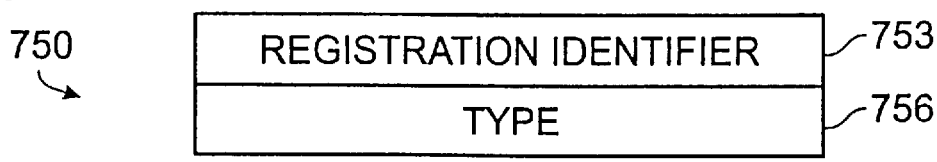

The event information 750 for a status_change event shown in FIG. 7D includes a registration identifier field 753 and a type field 756. Registration identifier field 753 contains the registration identifier of the application whose status should be monitored for the present scheduled action. Type field 756 indicates the status changes which should be monitored for that application by InstantON servicing agent 140. In one implementation, the status which can be monitored are: launching the application, normal termination, crash of the application, the application's connecting to InstantON servicing agent 140, and the application's disconnecting from InstantON servicing agent 140. Thus, the scheduled action takes place whenever the status change indicated in type field 756 occurs for the application having the registration identifier indicated in registration identifier field 753.

Action field 625 of scheduling record 600 indicates the action to be performed. In one implementation, the actions which can be performed by InstantON servicing agent 140 include launching or executing an application, terminating an application, and sending a message to an application.

In one embodiment, InstantON servicing agent 140 executes an application by providing the path name and parameters for the application, as stored in the application's registration record, to operating system 120 with a request that the application be executed. InstantON servicing agent 140 can terminate an application by sending a request to operating system 120 that the application's execution be terminated. Several types of messages can be sent, as discussed below.

Policy field 630 specifies the scheduling policy for the task. In one implementation, the scheduling policies include no policy, a late perform policy, and a restart policy. The late perform policy indicates that InstantON servicing agent 140 should perform the action even if the scheduled time has elapsed (e.g., system power was in the Off mode at the scheduled time). The restart policy indicates that InstantON servicing agent 140 should restart the application, if necessary, in order to perform the action. The no policy indicates no policy has been indicated.

Total count field 635 indicates the total number of times the scheduled action should occur. Total count field 635 can be any number ranging from zero to "always". Remaining count field 640 indicates the number of times the scheduled action will occur. If the system is not operational during a time when a periodic event would have occurred, the count is automatically reduced to account for the lost events. This prevents the periodic events from continuing until a time later than was originally intended. In one implementation, count field 635 can be set to "always" to indicate the action will be performed an unlimited number of times. Time stamp field 645 indicates the time of the last modification of scheduling record 600.

Message field 650 indicates the type of message and any data associated with that message. In one implementation, the message type can be no message, a conventional Windows™ message, a user-defined message, a save checkpoint message, a request for the application to exit, an about to enter Standby power mode message, and a just entered normal power mode message. In one implementation, if a message is scheduled to be sent to an application which is not connected to InstantON servicing agent 140, then InstantON servicing agent 140 queues the message for a period of time and delivers the message to the target if it connects before the application process exits. If the target application does not connect before it exits, then the message is deleted.

In another implementation, InstantON servicing agent 140 allows messages to be scheduled for applications which are not running at the time the scheduled task is to occur. If a scheduled task attempts to send a message to an application which is not running, then InstantON servicing agent 140 temporarily queues the message. InstantON servicing agent 140 then sends a request to operating system 120 to execute the application, based on the information stored in the registration database 170, and delivers the message to the target application. Once the message is received, the target application remains running or, alternatively, terminates execution on its own, in response to a message requesting that it terminate, or by a scheduled task.

Next time field 655 indicates the next scheduled time for the action of scheduling record 600. That is, at what time the task is next scheduled to occur. Memo field 660 provides a user-definable description of the scheduled task.

Applications operating on the computer system are able to access scheduling database 155 via InstantON servicing agent 140. In one embodiment, five procedure calls are utilized to provide this access: IonScheduleAction, IonDeleteActRecord, IonGetNextActID, IonCompareActID, and IonGetActRecord. Any application process can access scheduling database 155. In one implementation, a user interface is provided, such as user interface 180 of FIG. 1, which allows a user to access scheduling database 155.

An application schedules a task utilizing the IonScheduleAction procedure call. The IonScheduleAction procedure call is initiated by the calling application process utilizing the following parameters: a target identification, an action, an event, a message, a memo, a policy, a total count, and a pointer to a variable to receive the action identification. These parameters correspond to the fields of the scheduling record. Upon receiving the call, InstantON servicing agent 140 generates a scheduling record according to the parameters provided and returns the action identification of the newly created scheduling record to the calling application process. In one implementation, InstantON servicing agent 140 returns a value indicating success, that InstantON servicing agent 140 is unavailable, or that one of the parameters provided is invalid.

Actions are deleted from the scheduling database either automatically or by using the IonDeleteActRecord procedure call. Actions can be deleted automatically in several ways. First, actions which are scheduled to be performed only once are automatically deleted by InstantON servicing agent 140 when they are performed. Second, actions which have a total count value are deleted once the remaining count field reaches zero. Third, actions whose target registration identifier matches the registration identifier of a process which has de-registered from InstantON servicing agent 140 are deleted.

Actions which are not automatically deleted can be deleted using the IonDeleteActRecord procedure call. The calling application process makes the IonDeleteActRecord call with the parameter of a pointer to a variable that contains the action identification associated with the scheduling record. InstantON servicing agent 140 receives this procedure call and deletes the record having the indicated action identification from the scheduling database. In one implementation, InstantON servicing agent 140 returns a value indicating success, an invalid action identification, or that InstantON servicing agent 140 is unavailable.

The IonGetNextActID, IonCompareActID, and IonGetActRecord procedure calls retrieve the next action identification from the scheduling database, compare two action identifications, and retrieve an action record from the scheduling database. These procedure calls are analogous to the IonGetNextRegID, IonCompareRegID, and IonGetRegRecord procedure calls discussed above, except that values are compared and/or retrieved from the scheduling database rather than the registration database.

When InstantON servicing agent 140 completes a scheduled task from scheduling database 155, the time stamp field 645, next time field 655, and remaining count field 640 of the scheduling record 600 are updated as necessary.

In one embodiment of the present invention, multiple software timers are used by InstantON servicing agent 140 for different scheduled tasks. In one implementation, InstantON servicing agent 140 sets a software timer for each scheduled task. When one of these software timers expires, InstantON servicing agent 140 performs the scheduled task and deletes that software timer (periodic timers, however, are not deleted unless the remaining count of the scheduled task becomes zero). In this embodiment, when the system enters Standby mode, InstantON servicing agent 140 programs timer 105 with the smallest value contained in the software timers.

In one embodiment, InstantON servicing agent 140 utilizes a number of software timers equal to the number of scheduled tasks. However, it is to be appreciated that the number of timers used by InstantON servicing agent 140 can be any value equaling one or greater.

Figure 8:
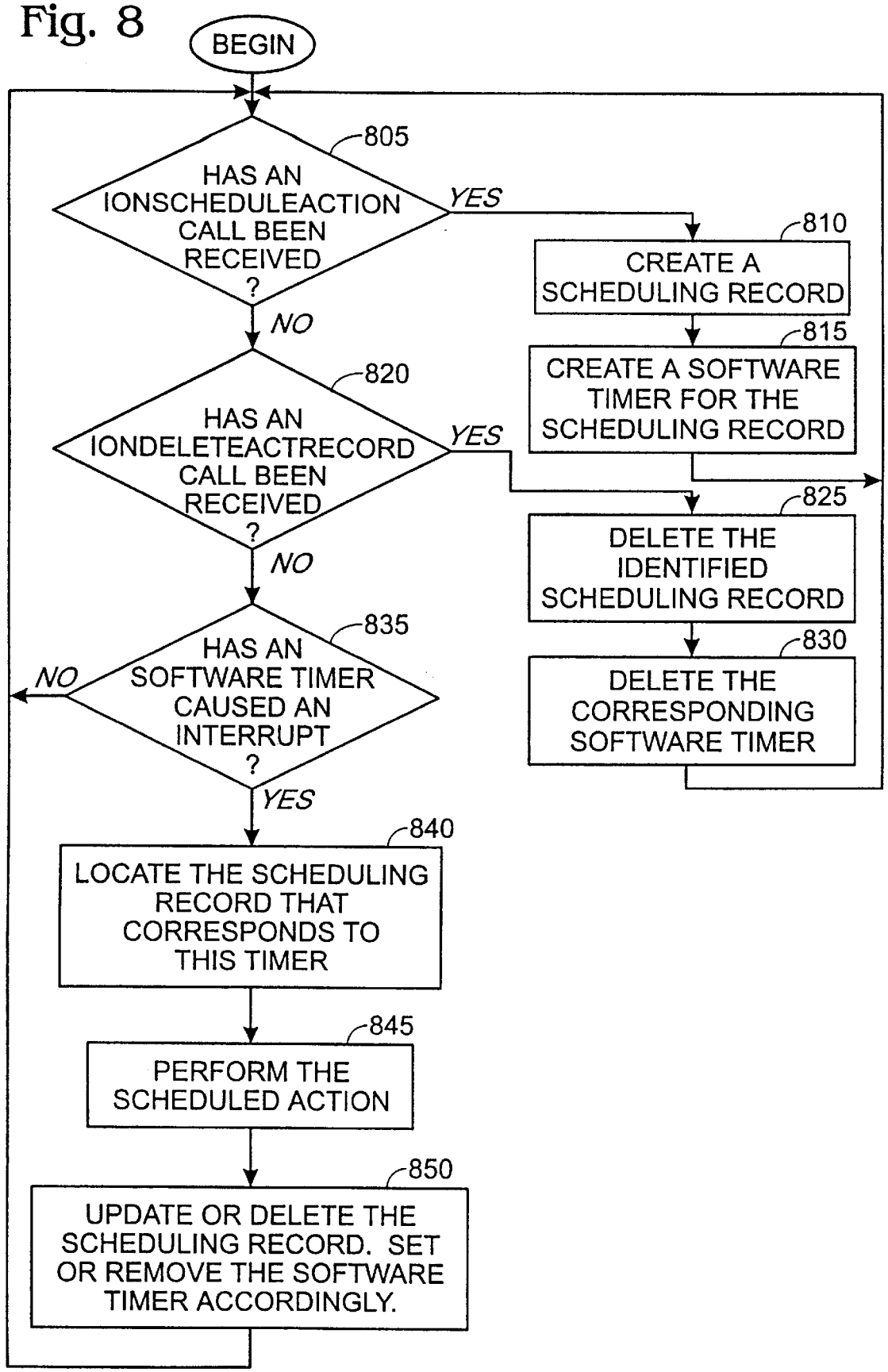
FIG. 8 is a flowchart showing the steps followed in scheduling tasks and performing scheduled tasks according to one embodiment of the present invention.

FIG. 8 is a flowchart showing the steps followed in scheduling tasks and performing scheduled tasks according to one embodiment of the present invention. FIG. 8 shows the logic followed by one embodiment of the present invention and it is to be appreciated that InstantON servicing agent 140 can be blocked by operating system 120 until input is received for servicing agent 140, thereby allowing other applications to utilize the processor and other resources of the system.

InstantON servicing agent 140 first checks whether an IonScheduleAction procedure call has been received, step 805. If an IonScheduleAction call has been received, then InstantON servicing agent 140 creates a scheduling record according to the information provided in the call, step 810. InstantON servicing agent 140 then creates a software timer for the task and sets the timer to the value in next time field 655 of the scheduling record, step 815. The software timer contains the action identification for the scheduled record, thereby enabling InstantON servicing agent 140 to quickly determine which scheduling record corresponds to which software timer. InstantON servicing agent 140 then returns to step 805 to continue processing.

If an IonScheduleAction call has not been received, then InstantON servicing agent 140 checks whether an IonDeleteActRecord call has been received, step 820. If an IonDeleteActRecord call has been received, then InstantON servicing agent 140 deletes the record identified by the call, step 825. InstantON servicing agent 140 then deletes the software timer corresponding to the identified scheduling record, step 830. InstantON servicing agent 140 then continues processing at step 805.

If an IonDeleteActRecord call has not been received, then InstantON servicing agent 140 checks whether a software timer has caused an interrupt, step 835. If no timer interrupt has been received, then InstantON servicing agent 140 continues processing at step 805.

However, if a system timer interrupt has been received, then InstantON servicing agent 140 locates the scheduling record with the software timer that caused the interrupt, step 840. The scheduled action is then performed, step 845.

If a "run application" or a "deliver a message with a restart policy" task is scheduled for an application process which is not currently running, then InstantON servicing agent 140 sends a message to operating system 120 to load the targeted application process into main memory using the parameters stored in the registration record for the process. Additionally, any checkpoint data saved by the application process is supplied to the process at its request, as discussed in more detail below.

When a scheduled action is performed, InstantON servicing agent 140 updates the next time field for the records whose action was performed, step 850. In addition, in step 850 InstantON servicing agent 140 also deletes the scheduling record and its corresponding software timer if the record has a remaining count equal to zero. InstantON servicing agent 140 then continues processing at step 805.

When the system is about to enter Standby mode, InstantON servicing agent 140 translates its closest alarm time into a wake up time which it programs in hardware timer 150. In one implementation, the closest alarm time is determined by searching scheduling database 155 for the record having the next time field 655 closest to the current system time. In an alternate implementation, the closest alarm time is determined by searching the software timers for the smallest value.

In one embodiment of the present invention, InstantON servicing agent 140 programs hardware timer 105 to expire a predetermined amount of time before the next scheduled action. This predetermined amount of time provides the system with sufficient time to restore operation before the scheduled action is to occur. For example, the predetermined amount of time provides the system with sufficient time to allow a disk drive in the system to spin up. In one implementation, this predetermined amount of time is ten seconds.

Additionally, the software timers utilized by the present invention are not operational when the system is in Standby mode. When the system resumes operation from Standby mode, InstantON servicing agent 140 updates the software timers to reflect the amount of time which the system spent in Standby mode. Thus, bringing the system out of Standby mode prior to the time the scheduled action is to occur provides InstantON servicing agent 140 with sufficient time to restore the software timers to their proper values.

Thus, the scheduling services of the present invention provide reliable task scheduling. Applications which need to be run to perform the task are executed, and tasks are performed regardless of whether the system is in a low-power mode when the scheduled time occurs. Additionally, scheduled tasks are performed without regard for whether the application which scheduled the task is running when the scheduled time occurs. Thus, scheduled tasks are performed across multiple execution sessions of both the target and originating application processes.

Checkpoint Services According to the Present Invention

InstantON servicing agent 140 provides checkpoint services to applications which facilitate recovery of the computer system after a crash or power failure. As discussed above, applications can register with InstantON servicing agent 140 to have one of several restart policies, some of which cause InstantON servicing agent 140 to restart an application when the computer system is restarted. Monitoring process 150 of InstantON servicing agent 140 keeps a record of those applications which are connected to InstantON servicing agent 140 at any particular time, thus, when the computer system is restarted, InstantON servicing agent 140 can readily determine which applications were connected when the system crashed. When the system reboots after a crash, InstantON servicing agent 140 examines registration database 170 and restarts those applications which had been running and had a crash restart policy as well as those applications with the policy to run on startup.

In order to return an application to its operational state at the time of the system crash or power failure, a record is used to determine what that operational state is. In one embodiment of the present invention, this record is generated by the checkpoint services of the present invention. Applications which are connected to InstantON servicing agent 140 periodically make procedure calls to InstantON servicing agent 140 which save the necessary state information for the application in checkpoint records. Then, upon restart, InstantON servicing agent 140 provides restarted applications with the stored checkpoint information when the applications request it, thereby allowing them to return to their operational state preceding the system crash. In one implementation, this operational state is the state at the last time the checkpoint services were called prior to the system crashing.

The checkpoint information can also be used in the same manner by an application to recover from the application crashing. If the application crashes and has a crash_restart policy, InstantON servicing agent 140 re-executes the application and provides the stored checkpoint information to the application when the application requests it.

In one embodiment of the present invention, InstantON servicing agent 140 keeps track of checkpoint information utilizing a checkpoint database. In one implementation, this is checkpoint database 165 of FIG. 1. The checkpoint database is stored in nonvolatile memory within the system, such as mass storage device 225 or mass storage device 236 of FIG. 2.

Checkpoint database 165 contains multiple checkpoint records. Each checkpoint record contains checkpoint information relating to a single application process. InstantON servicing agent 140 also keeps a record of which of these checkpoint records correspond to which application processes. A checkpoint record according to one implementation is shown in FIG. 9. Checkpoint record 900 contains a checkpoint identifier 910, a time stamp field 920, a size field 930, and a buffer 940. Checkpoint identifier 910 is a unique identification value for checkpoint record 900. Time stamp field 920 indicates the time when checkpoint record 900 was added to checkpoint database 165. Size field 930 indicates the size of buffer 940. Buffer 940 is one or more bytes of operational state information received from the application which requested generation of checkpoint record 900.

Applications can access the checkpoint services by using several procedure calls. In one embodiment, these procedure calls are: IonGetChkInfo, IonAddChkRecord, IonDeleteChkRecord, IonReplaceChkRecord, IonGetNextChkID, and IonGetChkRecord. In one implementation, in order to utilize the checkpoint services, the application first makes an IonConnect procedure call to connect the application process to InstantON servicing agent 140. The IonConnect procedure call is discussed above.

In one embodiment of the present invention, the checkpoint services support incremental checkpoint records. When using incremental records, the first time an application process calls InstantON servicing agent 140 the application process provides all of the operational state information. On subsequent calls, however, the application only provides changes to the original operational state information, thereby typically resulting in the second and subsequent procedure calls having less information than the first call. InstantON servicing agent 140 saves both of these records, thus resulting in multiple checkpoint records for the application process.

The IonGetChkInfo procedure call provides the calling process with information about the checkpoints for that process. The calling process includes, as a parameter for the procedure call, a pointer to a variable that contains the InstantON registration identifier for the calling process. InstantON servicing agent 140 receives this identifier and checks the checkpoint database for checkpoint records which correspond to the received registration identifier. InstantON servicing agent 140 then returns a message indicating that records were found, the last modification time stamp of those found records, and the size of the largest checkpoint record for this application process. In one implementation, if the call is unsuccessful, InstantON servicing agent 140 returns a message indicating that no records exist for that registration identifier, that InstantON servicing agent 140 is unavailable, or that an invalid parameter was passed to InstantON servicing agent 140.

The IonAddChkRecord procedure call allows the calling application process to generate a new checkpoint record. The calling process includes, as parameters, a pointer to a buffer and the size of that buffer. Prior to making the procedure call, the process generates the operational state information necessary for it to return to its current state. If this is the first time the process has called the checkpoint services, then all operational state information is saved. However, if this is a second or later call, then only incremental changes need to be included. The amount and nature of this checkpoint information being saved is dependent on the application process. Thus, the checkpoint records for each application process can be different. Upon receiving the IonAddChkRecord call, InstantON servicing agent 140 generates a checkpoint record for the process, storing the time the procedure was called, the size of the buffer and the data in the buffer. InstantON servicing agent 140 keeps track of all of the checkpoint identifiers associated with each application process based on the registration identifier for the process. Thus, multiple checkpoint records can be associated with the process regardless of whether the process was terminated and re-executed between the saving of the checkpoint records. In one implementation, InstantON servicing agent 140 returns a message indicating that the call was successful, that the calling process is not connected to InstantON servicing agent 140, that InstantON servicing agent 140 is unavailable, or that an invalid parameter was passed to InstantON servicing agent 140.

The IonDeleteChkRecord procedure call is utilized by the calling application to delete a checkpoint record. The calling application process includes, as parameters, the checkpoint identifier for the record to be deleted and a flag. The flag indicates whether all checkpoint records for the calling application process should be deleted, or just the checkpoint record having the indicated checkpoint identifier. Upon receiving the call, InstantON servicing agent 140 deletes the indicated checkpoint record(s). In one implementation, InstantON servicing agent 140 returns a message indicating that the call was successful, that the calling process is not connected to InstantON servicing agent 140, that InstantON servicing agent 140 is unavailable, or that the received checkpoint identifier was invalid.

The IonReplaceChkRecord procedure call allows the calling process to replace all existing checkpoint records for that process. This can be used, for example, for a calling process to replace several incremental checkpoint records with a single record. The calling process includes as parameters for the call a pointer to a variable that contains the checkpoint identifier for the record to be replaced, the size of the new buffer, a pointer to the new buffer, and a flag. The flag indicates whether all checkpoint records for the calling process should be replaced or just the checkpoint record which is identified. Upon receiving the IonReplaceChkRecord call, InstantON servicing agent 140 generates a new checkpoint record for the new data and then deletes the checkpoint record(s) being replaced. Thus, if a power failure were to occur during the saving of the new checkpoint record, the old checkpoint records would still be available to be used on restart. In one implementation, InstantON servicing agent 140 returns a message indicating that the call was successful, that the calling process is not connected to InstantON servicing agent 140, or that InstantON servicing agent 140 is unavailable.

In one embodiment of the present invention, checkpoint records remain in checkpoint database 165 until the IonDeleteChkRecord procedure is called, the IonReplaceChkRecord procedure is called, or the application process deregisters. Therefore, checkpoint records remain in checkpoint database 165 when the application process terminates execution (so long as it does not deregister). Thus, the checkpoint records persist across multiple execution sessions of the application process, without regard for whether the application was terminated voluntarily or involuntarily (e.g., a crash or power failure).

The IonGetNextChkID procedure call is used by the calling process to retrieve the next checkpoint identifier for the calling process. This procedure call can be used, for example, for a calling process to access each of several incremental checkpoint records for the process. The calling process includes, as parameters, a pointer to a variable that contains the checkpoint identifier associated with the instantON checkpoint record and a pointer to the variable that receives the next checkpoint identifier. In one implementation, a value of "ION_NULL_ID" is used as the checkpoint identifier associated with the InstantON checkpoint record to retrieve the first checkpoint identifier. Upon receiving the IonGetNextChkID call, InstantON servicing agent 140 determines the registration identifier of the checkpoint record indicated by the checkpoint identifier. The checkpoint identifier of the checkpoint record having the time stamp closest to the time stamp of the identified checkpoint record is returned. Thus, InstantON servicing agent 140 returns the checkpoint identifier for the next checkpoint record. In one implementation, InstantON servicing agent 140 also returns a message indicating that the call was successful, that the calling process is not connected to InstantON servicing agent 140, that InstantON servicing agent 140 is unavailable, or that no next checkpoint identifier exits.

The IonGetChkRecord procedure call allows the calling process to retrieve its checkpoint record(s). The calling process includes as parameters for the call a pointer to a variable the contains the checkpoint record identifier, the size of the record buffer, a variable that receives the actual checkpoint record buffer size, and a variable the receives the checkpoint record. Upon receiving the IonGetChkRecord procedure call, InstantON servicing agent 140 retrieves the identified checkpoint record from the checkpoint database and returns it to the calling process. In one implementation, InstantON servicing agent 140 returns a message indicating that the call was successful, that the calling process is not connected to InstantON servicing agent 140, that InstantON servicing agent 140 is unavailable, or that a received parameter is invalid (for example, if the size of the record buffer is smaller than the actual size of the checkpoint record buffer).

In one embodiment of the present invention, InstantON servicing agent 140 provides periodic checkpoint reminders to connected applications. These reminders are messages requesting checkpoint data from the applications. In one embodiment, the connected applications rely on the checkpoint reminders, and only provide checkpoint information to InstantON servicing agent 140 when a checkpoint reminder is received. In one implementation, checkpoint reminders are scheduled by InstantON servicing agent 140 using the scheduling services of the present invention to create a periodic action to be performed once the application process is running. Alternatively, the connected application can initiate checkpoint saves on its own, according to whatever criteria make sense for that application.

Figure 10:
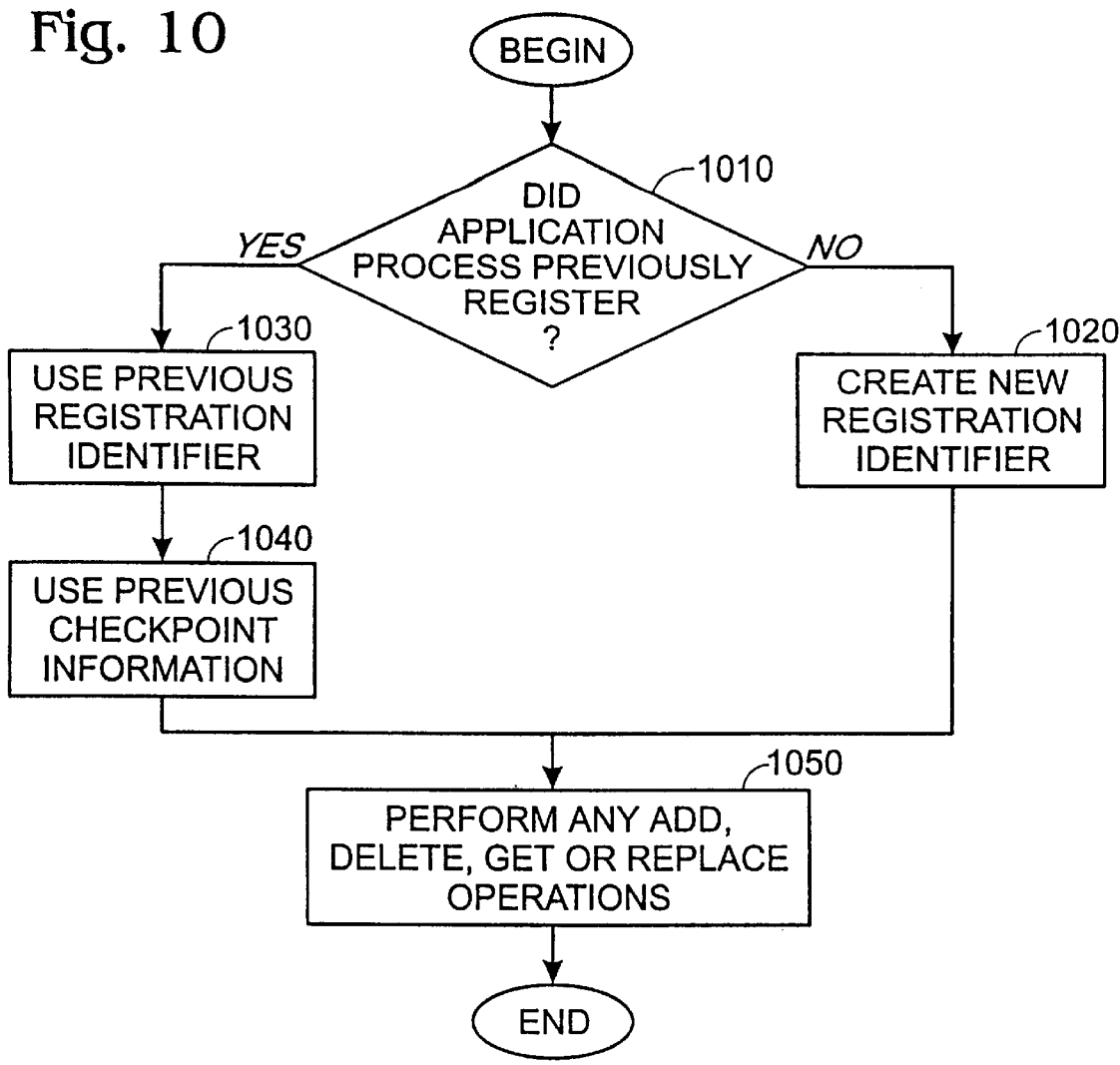
FIG. 10 is a flowchart showing the steps followed in accessing checkpoint information according to one embodiment of the present invention.

FIG. 10 is a flowchart showing the steps followed in accessing checkpoint information according to one embodiment of the present invention. FIG. 10 shows the logic followed by one embodiment of the present invention and it is to be appreciated that InstantON servicing agent 140 can be blocked by operating system 120 until input is received for servicing agent 140, thereby allowing other applications to utilize the processor and other resources of the system.

When an application process registers, InstantON servicing agent 140 first checks whether the application previously registered, step 1010. If the application process did not previously register, then a new registration identifier is created and assigned to the process, step 1020. However, if the application process did previously register, then the previous registration identifier is used for this process, step 1030. These steps are performed using the IonGetInfo and IonRegister procedure calls discussed above with reference to FIG. 5.

Additionally, if the process did previously register, then any previously stored checkpoint information is available to this process, step 1040. InstantON servicing agent 140 provides the previously stored checkpoint information to the process when the process requests it. Once the registration identifier is obtained, InstantON servicing agent performs any add, delete, get or replace operations requested by the process, step 1050. In one implementation, these operations are requested via the IonGetChkInfo, IonAddChkRecord, IonDeleteChkRecord, IonReplaceChkRecord, IonGetNextChkID, and IonGetChkRecord procedure calls discussed above.

Thus, the checkpoint services of the present invention provide an efficient mechanism for the storage of checkpoint data. The checkpoint services provide reliable storage for multiple applications, as well as multiple processes of the same application.

Figure 11:
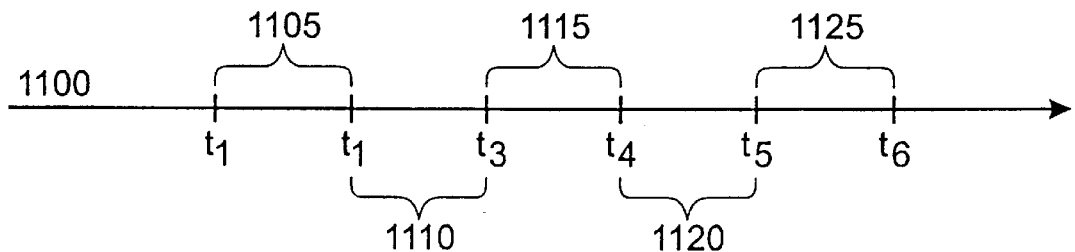
FIG. 11 is a time line showing example execution sessions of an application process on a computer system.

An Example of Multiple Execution Sessions According to One Embodiment of the Present Invention FIG. 11 shows a time line 1100 displaying example execution sessions of an application process on a computer system. The application process is executed at time $t_1$ and remains running for time period 1105 until time $t_2$. When the process is executed it is assigned a process identification by the Windows™ operating system. The process keeps this process identification until execution is terminated at time $t_2$. Once running, the application process registers with InstantON servicing agent 140. Assuming this is the first time the process has registered, the process is assigned a registration identifier and InstantON servicing agent 140 generates and stores a registration record for the process. The process is then able to make use of the scheduling and checkpoint services provided by InstantON servicing agent 140.

At time $t_2$, the execution of the process is terminated. As discussed above, execution can be terminated either voluntarily (e.g., the user quits the application) or involuntary (e.g., a power failure). The process is not running for time period 1110, and is re-executed at time $t_3$. The process can be re-executed in a wide variety of manners, as discussed above. For example, a scheduled task may require the application, or the system user may execute the application.

When the application is re-executed, the application process is assigned a new process identification by the Windows™ operating system. There is no correlation between this new process identification and the process identification assigned during time period 1105. However, when the application calls InstantON servicing agent 140 using the IonGetInfo or IonRegister procedure calls, servicing agent 140 recognizes that the process is the previously-registered process, and utilizes the same registration identifier. Thus, any information which was previously stored in the registration record for this registration identifier is used for the application process, such as the registration policy. Additionally, any checkpoint records which were generated for this application process are also available for the process.

Maintaining the same registration identifier also enables this and other applications to schedule tasks for the application. Scheduled tasks only need to indicate the registration identifier of the application. When the time or event for the scheduled task occurs, InstantON servicing agent 140 can determine the target application and whether it is currently running by accessing the target application's registration record. InstantON servicing agent 140 then executes the application if necessary to carry out the scheduled task, provided the scheduled task has a restart policy.

Execution of the application process then terminates at time $t_4$, and remains terminated for time period 1120. At time $t_5$, the application process is executed again and remains running for the time period 1125. The application process is assigned yet another different process identification by the Windows™ operating system for the time period 1125, however the application process maintains the same registration identifier.

User Interface According to One Embodiment of the Present Invention

Figure 12:
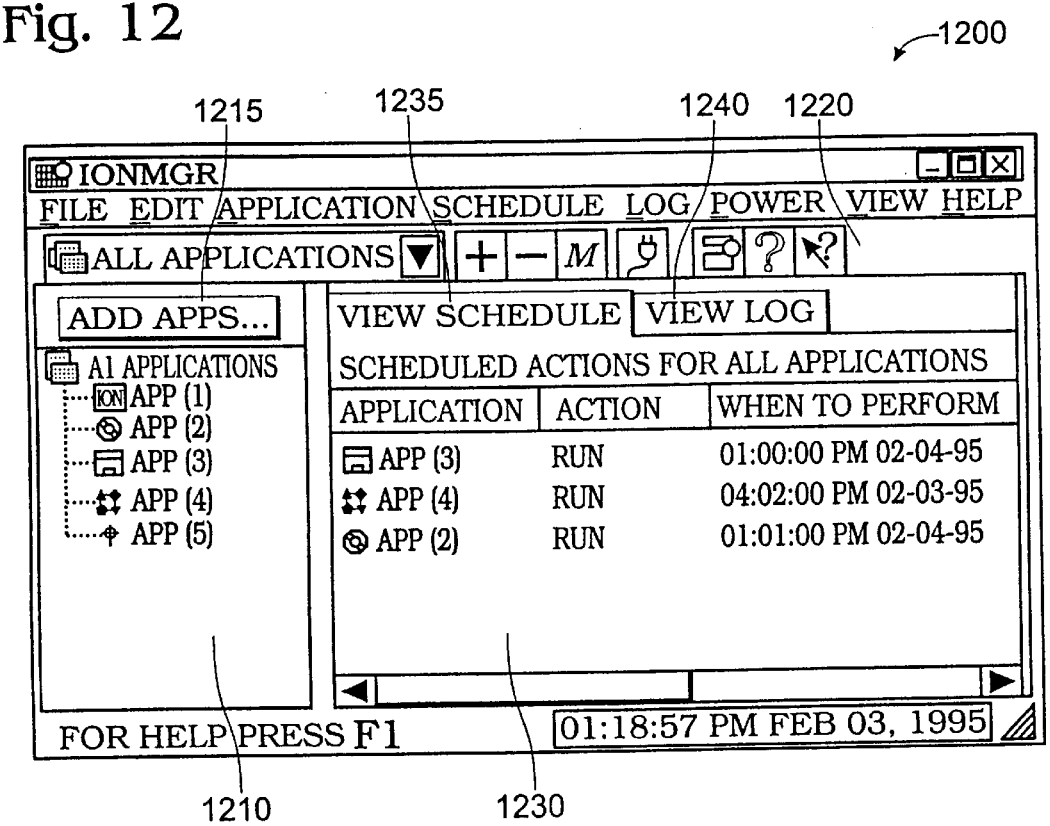
FIG. 12 shows a user interface window displaying registered and scheduled applications according to one embodiment of the present invention.
Figure 13:
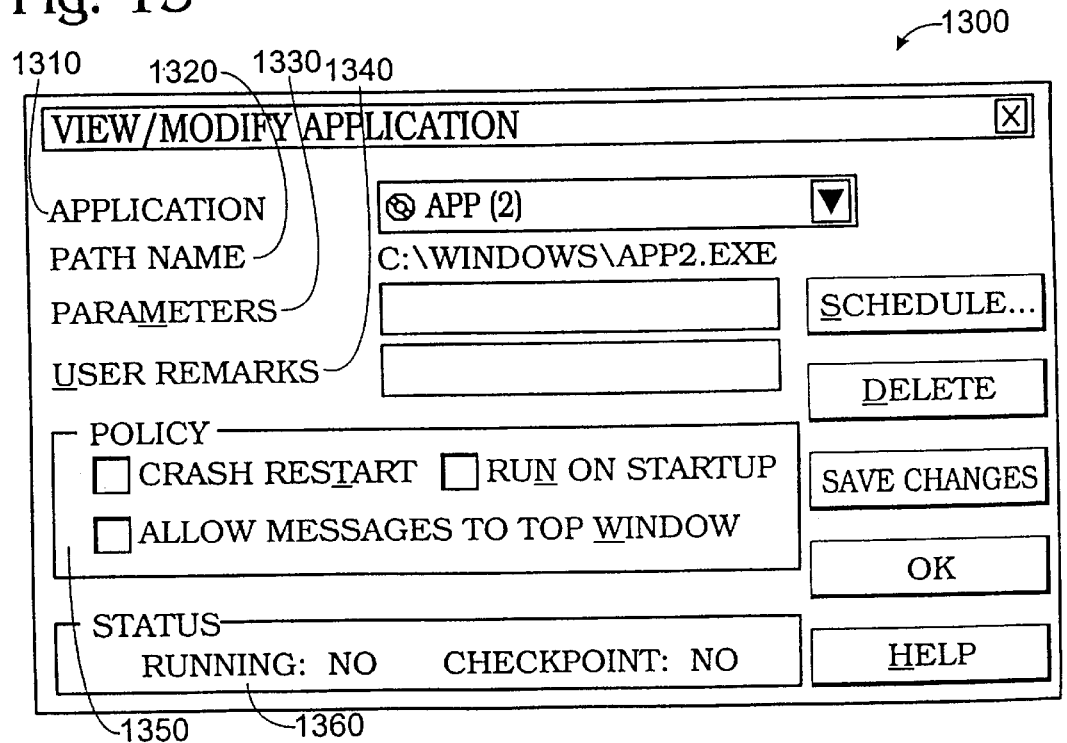
FIG. 13 shows a user interface window displaying application registration information according to one embodiment of the present invention.
Figure 14:
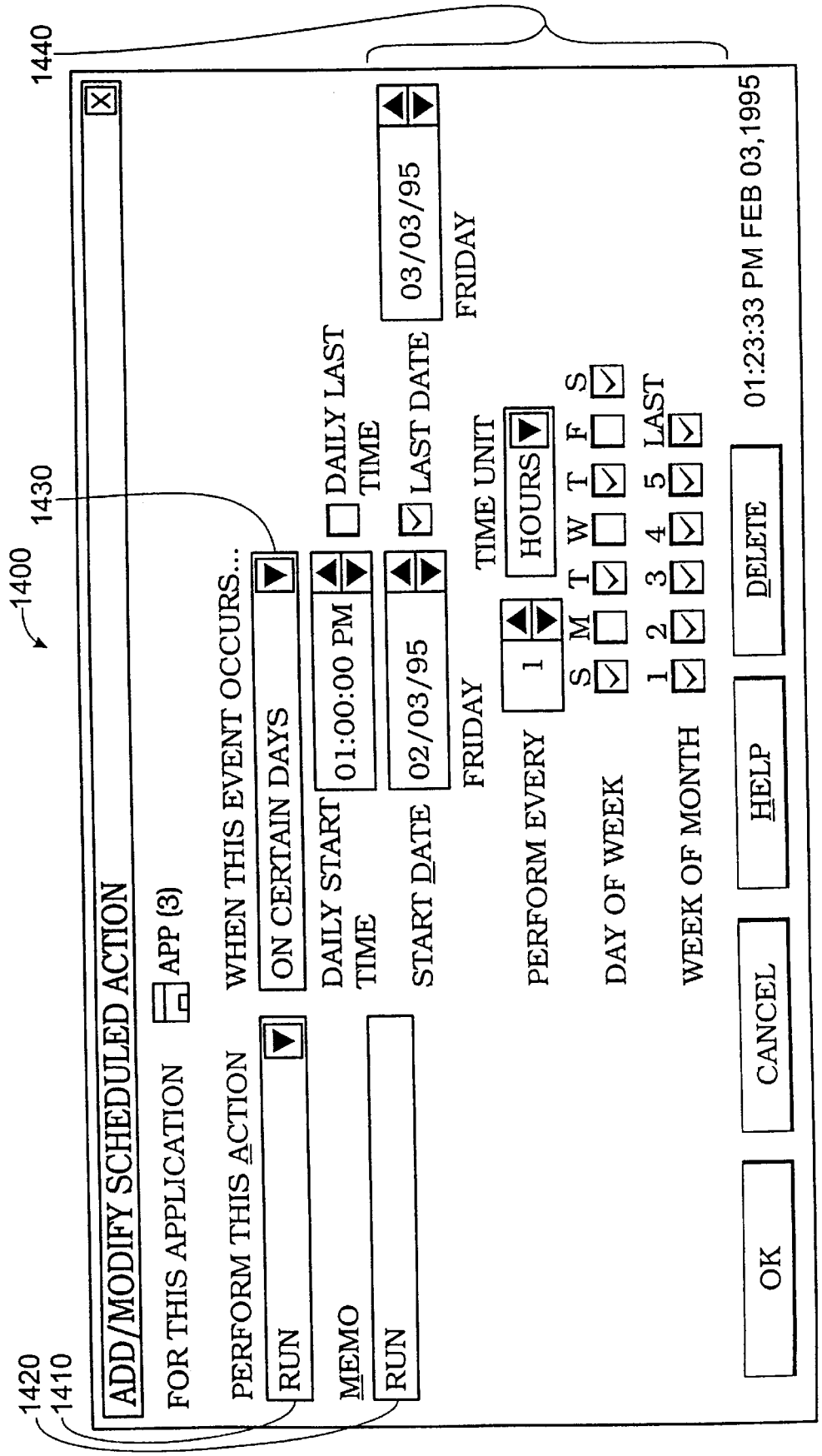
FIG. 14 shows a user interface scheduling window displaying scheduled tasks according to one embodiment of the present invention.

FIGS. 12, 13 and 14 show user interfaces according to one embodiment of the present invention. These user interfaces provide a system user with access to InstantON servicing agent 140 of FIG. 1, allowing the user to add, delete and modify records of the present invention. In one implementation, these interfaces are generated by InstantON manager user interface 180 of FIG. 1. The interfaces shown are graphical user interfaces (GUIs), however it is to be appreciated that any of a wide variety of conventional interfaces can be utilized to provide system users with access to InstantON servicing agent 140.

FIG. 12 shows a main window 1200 separated into an application view area 1210, a toolbar 1220, and action display area 1230. Application view area 1210 displays a list of registered applications in a conventional tree format. Additional applications can be registered by selecting Add App button 1215. Action display area 1230 displays the scheduled applications, the scheduled actions, and the time of the scheduled actions. Action display area 1230 may also be utilized to display log records for registered applications. The system user can view scheduling records and log records by selecting the view schedule button 1235 and the view log button 1240, respectively. Toolbar 1220 provides options for the user to search and filter the actions displayed in action display area 1230.

FIG. 13 shows a window 1300 which allows a system user to view and/or modify InstantON application registration information. Any of the fields displayed in window 1300 can be modified by the user. The user selects the application to view or modify in application field 1310. Path field 1320 displays the current execution path of the application. Parameters field 1330 displays any recorded parameters used by the application when it is executed. User remarks field 1340 displays any remarks or memoranda which are stored for this application. User remarks field 1340 allows the user to enter remarks distinguishing multiple instances or processes of the same application. Policy field 1350 displays the restart policy for the application. Status field 1360 indicates whether a process of the application is currently running, and whether any checkpoint data is saved for the application.

FIG. 14 shows a scheduling window 1400 which allows a system user to add and/or modify scheduled tasks. Any of the fields shown in scheduling window 1400 can be modified by the system user. Action field 1410 indicates the action to be performed (e.g., run or terminate). Memo field 1420 allows the user to enter remarks or memoranda describing the scheduled task. Occurrence field 1430 indicates whether the task is scheduled to occur at the present time (e.g., now), on certain days, in response to power events, or in response to application status changes. Scheduling fields 1440 allow the system user to specify which days, times, weeks, etc. the to schedule the task.

It should be noted that, in the discussions above, certain procedure calls are discussed as having parameters of particular variables or having parameters as pointers to variable locations. Performing calls to procedures with variables and/or pointers to variable locations is well-known to those skilled in the art, and it is to be appreciated that either method or combination thereof can be utilized for any of the procedure calls discussed above.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, a method and apparatus for task scheduling across multiple execution sessions has been described.

What is claimed is:

1. A method comprising:
    identifying an action of a plurality of actions, corresponding to a target application process, which is to be performed by a computer system;
    identifying an event of a plurality of events which causes the action to be performed;
    identifying a unique persistent identifier of the target application process;
    storing the event, the action, and the unique persistent identifier;
    allowing execution of the target application process in the computer system to terminate; and
    identifying the target application process, subsequent to terminating execution of the target application process, using the unique identifier when the event occurs.

2. The method of claim 1, further comprising:
    allowing the computer system to transition to a low power mode; and
    transitioning the computer system from the low power mode to a full power mode when the event occurs.

3. The method of claim 2, further comprising generating a software timer for the event, wherein the software timer indicates when the action is to be performed.

4. The method of claim 3, further comprising converting the software timer to a hardware timer prior to transitioning the computer system to the low power mode.

5. The method of claim 2, wherein the transitioning comprises transitioning the computer system to the full power mode in response to a hardware timer expiring.

6. The method of claim 1, wherein the event is a time event.

7. The method of claim 6, further comprising setting a hardware timer to expire a predetermined period of time before the time event.

8. The method of claim 1, wherein the event is a change in the power level of the computer system.

9. The method of claim 1, wherein the event is a status change of a second application process.

10. The method of claim 1, wherein the event is a period of time after the occurrence of a scheduled task.

11. The method of claim 1, wherein the action comprises executing the target application process.

12. The method of claim 11, further comprising accessing a registration database to determine a necessary set of parameters used to execute the target application process.

13. The method of claim 1, wherein the action comprises terminating the target application process.

14. The method of claim 1, wherein the action comprises sending a message to the target application process.

15. An apparatus which provides task scheduling in a computer system across multiple execution sessions, the apparatus comprising:
    a storage medium to store scheduling information, wherein the scheduling information includes a first identifier identifying an action of a plurality of actions, corresponding to a target application process, which is to be performed by the computer system, and a second identifier identifying an event of a plurality of events which causes the action to be performed; and a server process, communicatively coupled to the storage device, operative to allow execution of the target application process in the computer system to terminate and further operative to identify the target application process, subsequent to the termination of execution of the target application process, when the event occurs.

16. The apparatus of claim 15, wherein the scheduling information includes a scheduling database which contains a scheduling record.

17. The apparatus of claim 16, wherein the server process generates a software timer for each of a plurality of scheduling records.

18. The apparatus of claim 15, wherein the server process initiates execution of the target application process when the event occurs, provided the target application process is not already executing.

19. An apparatus comprising:

means for identifying an action of a plurality of actions, corresponding to a target application process, which is to be performed by a computer system;

means for identifying an event of a plurality of events which causes the action to be performed;

means for identifying a unique persistent identifier of the target application process;

means for storing the event, the action, and the unique persistent identifier;

means for allowing execution of the target application process in the computer system to terminate; and means for identifying the target application process, subsequent to terminating execution of the target application process, by using the unique identifier when the event occurs.

20. The apparatus of claim 19, further comprising:

means for allowing the computer system to transition to a low power mode; and means for transitioning the computer system from the low power mode to a full power mode when the event occurs.

21. The apparatus of claim 20, further comprising means for generating a software timer for the event, wherein the software timer indicates when the action is to be performed.

22. The apparatus of claim 21, further comprising means for converting the software timer to a hardware timer prior to transitioning the computer system to the low-power mode.

23. The apparatus of claim 19, further comprising means for setting a hardware timer to expire a predetermined period of time before the event.

24. A machine-readable storage medium having stored therein a plurality of programming instructions that implements the method steps of:

a) identifying an action of a plurality of actions, corresponding to a target application process, which is to be performed by a computer system;

b) identifying an event of a plurality of events which causes the action to be performed;

c) identifying a unique persistent identifier of the target application process;

d) storing the event, the action, and the unique persistent identifier;

e) allowing execution of the target application process in the computer system to terminate; and f) identifying the target application process, subsequent to terminating execution of the target application process, using the unique identifier when the event occurs.

25. The machine-readable storage medium of claim 24, wherein the plurality of programming instructions further implement the method steps of:

allowing the computer system to transition to a low power mode; and transitioning the computer system from the low power mode to a full power mode when the event occurs.

26. The machine-readable storage medium of claim 24, wherein the event is a time event.

27. The machine-readable storage medium of claim 24, wherein the event is a status change of a second application process.

28. The machine-readable storage medium of claim 24, wherein the action comprises executing the target application process.

* * * * *

UNITED STATES PATENT AND TRADEMARK OFFICE
CERTIFICATE OF CORRECTION

PATENT NO. : 5,902,352  
DATED : May 11, 1999  
INVENTOR(S) : Chou et al

It is certified that error appears in the above-identified patent and that said Letters Patent is hereby corrected as shown below:

Please amend the claims in the above-referenced allowed application as follows:

20. An apparatus which provides task scheduling in a computer system across multiple execution sessions, the apparatus comprising:
    a storage medium to store scheduling information, wherein the scheduling information includes a first identifier identifying an action of a plurality of actions, corresponding to a target application process, which is to be performed by the computer system, and a second identifier identifying an event of a plurality of events which causes the action to be performed; and
    a server process, communicatively coupled to the storage medium, operative to allow execution of the target application process in the computer system to terminate and further operative to identify the target application process, subsequent to the termination of execution of the target application process, when the event occurs.

Signed and Sealed this

Eighteenth Day of September, 2001

*Attest:*

NICHOLAS P. GODICI  
*Attesting Officer*     Acting Director of the United States Patent and Trademark Office